(12) United States Patent
Fujita et al.

(10) Patent No.: US 9,637,033 B2
(45) Date of Patent: May 2, 2017

(54) LIFTER MECHANISM AND VEHICLE SEAT

(71) Applicant: Delta Tooling Co., Ltd., Hiroshima-shi (JP)

(72) Inventors: Etsunori Fujita, Higashihiroshima (JP); Yumi Ogura, Higashihiroshima (JP); Seiji Kawasaki, Higashihiroshima (JP); Katsuhiro Inoue, Hiroshima (JP); Eiji Sugimoto, Higashihiroshima (JP); Minoru Nakamura, Hiroshima (JP); Ryuji Kuwano, Hiroshima (JP); Atsushi Nishida, Hiroshima (JP)

(73) Assignee: DELTA TOOLING CO., LTD., Hiroshima-shi (JP)

( * ) Notice: Subject to any disclaimer, the term of this patent is extended or adjusted under 35 U.S.C. 154(b) by 0 days.

(21) Appl. No.: 14/905,195

(22) PCT Filed: Jul. 11, 2014

(86) PCT No.: PCT/JP2014/068639
§ 371 (c)(1),
(2) Date: Jan. 14, 2016

(87) PCT Pub. No.: WO2015/008713
PCT Pub. Date: Jan. 22, 2015

(65) Prior Publication Data
US 2016/0176325 A1 Jun. 23, 2016

(30) Foreign Application Priority Data

Jul. 14, 2013 (JP) .................................. 2013-147144
Dec. 7, 2013 (JP) .................................. 2013-253711

(51) Int. Cl.
*A47C 1/00* (2006.01)
*B60N 2/50* (2006.01)
(Continued)

(52) U.S. Cl.
CPC ............... *B60N 2/501* (2013.01); *B60N 2/06* (2013.01); *B60N 2/165* (2013.01); *B60N 2/166* (2013.01);
(Continued)

(58) Field of Classification Search
CPC ......... B60N 2/06; B60N 2/165; B60N 1/1615
(Continued)

(56) References Cited

U.S. PATENT DOCUMENTS 4,556,185 A * 12/1985 Takagi .................... B60N 2/045
248/421
6,264,275 B1 * 7/2001 Frohnhaus ............. B60N 2/165
297/344.12

(Continued)

FOREIGN PATENT DOCUMENTS

| JP | 60-164439 U | 10/1985 |
| JP | 10-100757 A | 4/1998 |
| JP | 11 99857 A | 4/1999 |

OTHER PUBLICATIONS

International Search Report Issued Sep. 30, 2014 in PCT/JP14/068639 Filed Jul. 11, 2014.

*Primary Examiner* — Laurie K Cranmer
(74) *Attorney, Agent, or Firm* — Oblon, McClelland, Maier & Neustadt, L.L.P.

(57) ABSTRACT

A neck injury is improved with a structure having a lifting mechanism part only on one side. While a lifting driving part is provided on a side of one side frame, a coupling driving rod is coupled to a rotation center of a drive gear a driving link is disposed on a side of the other side frame, and the driving link is coupled to the coupling driving rod. A driving force in the lifting driving part operates on the side of one side frame having the drive gear, but on the side of the other side frame, the driving link rotates together with the drive gear via the coupling driving rod, so as to perform a lifting
(Continued)

or lowering operation. The shape of a virtual square coupling contact points of the driving link, the side connectors, the coupling driving rod, and the drive gear does not collapse, and thus an external input is dispersed.

10 Claims, 18 Drawing Sheets

(51) Int. Cl.
  *B60N 2/06* (2006.01)
  *B60N 2/16* (2006.01)
  *B60N 2/427* (2006.01)

(52) U.S. Cl.
  CPC ....... *B60N 2/1615* (2013.01); *B60N 2/42709* (2013.01); *B60N 2/509* (2013.01)

(58) Field of Classification Search
  USPC ........................................ 297/344.15, 344.16
  See application file for complete search history.

(56) References Cited

U.S. PATENT DOCUMENTS

| | | | | |
|---|---|---|---|---|
| 6,290,198 B1* | 9/2001 | Kojima | ................ | B60N 2/1615 248/396 |
| 6,488,337 B1* | 12/2002 | De Voss | ................ | B60N 2/181 248/419 |
| 7,066,540 B2* | 6/2006 | Minai | .................... | B60N 2/165 248/421 |
| 7,300,108 B2* | 11/2007 | Canteleux | ............ | B60N 2/1685 297/216.1 |
| 7,316,454 B2* | 1/2008 | Yoshida | ................. | B60N 2/165 297/344.14 |
| 7,766,427 B2* | 8/2010 | Kojima | .................... | B60N 2/06 248/423 |
| 7,770,863 B2* | 8/2010 | Yamada | ................. | B60N 2/165 248/419 |
| 7,861,994 B2* | 1/2011 | Yamada | ............... | B60N 2/1615 248/421 |
| 7,984,950 B2* | 7/2011 | Hoshi | .................. | B60N 2/1615 297/344.1 |
| 8,177,280 B2* | 5/2012 | Yamada | ................. | B60N 2/161 296/65.05 |
| 8,353,558 B2* | 1/2013 | Okamoto | ............ | B60N 2/1615 297/216.1 |
| 8,366,194 B2* | 2/2013 | Yamamoto | ........... | B60N 2/0232 297/284.11 |
| 8,590,971 B2* | 11/2013 | Ito | ........................ | B60N 2/1615 297/344.13 |
| 8,596,721 B2* | 12/2013 | Ozawa | ................. | B60N 2/1615 248/421 |
| 8,616,636 B2* | 12/2013 | Arata | .................... | B60N 2/1615 297/216.1 |
| 8,616,645 B2* | 12/2013 | Ito | ........................ | B60N 2/1615 297/344.15 |
| 2007/0194613 A1* | 8/2007 | Kojima | ................ | B60N 2/0705 297/344.15 |
| 2010/0001569 A1* | 1/2010 | Shinozaki | ............ | B60N 2/1615 297/344.15 |

* cited by examiner

US 9,637,033 B2

LIFTER MECHANISM AND VEHICLE SEAT

TECHNICAL FIELD

The present invention relates to a vehicle seat for automobiles, aircrafts, trains, boats, buses, and the like, and particularly relates to a lifter mechanism of a vehicle seat suitable as a driver's seat or a passenger's seat of an automobile and a vehicle seat having the lifter mechanism.

BACKGROUND ART

Conventionally, as a lifter mechanism having a lifting mechanism part which lifts or lowers a seat, for example, there is a lifter mechanism disclosed in Patent Document 1. This lifter mechanism disclosed in Patent Document 1 has upper rails of a left slider and a right slider, a left link and a right link pivotally coupled to side frames of a cushion frame unit disposed on an upper side thereof and also coupled to each other via a shaft, and one lifting mechanism part which lifts or lowers the side frame on one side (door side) with respect to the slider on the one side (door side). The lifting mechanism part has a sector gear rotatably attached to the vicinity of a forward-backward center inside the side frame on the one side, a connector coupling a rear link on the one side and the sector gear, and an output gear cooperating with an operating member meshing with the sector gear. By rotating the output gear via the operating member, the link on the one side is swung via the sector gear and the connector meshing therewith, thereby lifting or lowering the side frame on the one side with respect to the slider on one side. Then, accompanying this lifting or lowering operation of the side frame on the one side, as described above, the side frame on the other side coupled via the shaft is lifted or lowered.

PRIOR ART DOCUMENT

Patent Document

Patent Document 1: Japanese Utility Model Application Publication No. 60-164439

DISCLOSURE OF THE INVENTION

Problems to be Solved by the Invention

Thus, in the conventional lifter mechanism, the lifting mechanism part is disposed only on one side, the side frame on one side is lifted or lowered by a driving force thereof, and the side frame on the other side is just lifted or lowered by following the lifting or lowering operation of the side frame on the one side via the shaft coupling the both. That is, in this structure, the driving force for the lifting or lowering operation of the cushion frame unit directly operates only on one side. Accordingly, the lifting or lowering operation of the side frame on the other side where the lifting mechanism part is not provided is not smooth. As one of means to solve this problem, it is conceivable to provide the lifting mechanism part on both the side frames constituting the cushion frame unit, but in this case, the structure is complicated and there is a concern in terms of costs.

Further, when an external input of a predetermined value or higher operates by a rear collision, the lifter mechanism disclosed in Patent Document 1 attempts to resist this external input by the side frame on the one side where the lifting mechanism part is provided, and thus a force operates to lift a front end of the side frame on the one side and to push down a rear end of the side frame on the other side located on a diagonal line therefrom. Such a large deformation imbalanced to left and right leads to a phenomenon such that not only a lowered amount on the rear end becomes large but a deformation speed when being deformed downward does not become constant, and the lowered amount becomes large suddenly temporarily. As a result, a phenomenon occurs such that the head of the seated person moves away from the head rest and the head hits the head rest several times. Then an acceleration difference between the head and the chest in the rear collision increases, and a value of Neck Injury Criterion (NIC) in neck injury protection performance evaluation defined in the JNCAP (Japan New Car Assessment Program) becomes large.

The present invention has been made in view of the above situation, and has an object to provide a lifter mechanism capable of smoothing a lifting or lowering operation of a left side frame and a right side frame of the cushion frame unit, receiving an external input of a predetermined value or higher in a well-balanced manner to left and right of the cushion frame unit so as to suppress loss of a balance during a deformation of the left and right side frames, improving a neck injury more than in the conventional one, and moreover having a simple structure and not leading to a large cost increase, and a vehicle seat having the lifter mechanism, in a structure including a lifting mechanism part only on one side of a cushion frame unit.

Means for Solving the Problems

In order to solve the above problems, a lifter mechanism according to the present invention is a lifter mechanism for supporting a cushion frame unit supporting a cushion member for a seat cushion part in a manner capable of lifting or lowering by driving a lifting driving part with respect to a left slider and a right slider constituting a seat slide device, wherein:

a front link and a rear link are provided between each of side frames disposed on a left side and a right side of the cushion frame unit and one of the sliders;

the lifting driving part has a drive gear provided on one side frame out of the side frames and disposed between the front link and the rear link of a side of the one side frame, so as to transmit a driving force for lifting or lowering;

one end of a coupling driving rod rotating with the drive gear is coupled to a rotation center of the drive gear;

the lifter mechanism has one side connector on the side of the one side frame where the lifting driving part is provided, the one side connector extending forward from the rear link of the side of the one side frame and bridged to the drive gear;

the lifter mechanism has another side connector on a side of the other side frame where the lifting driving part is not provided to extend forward from the rear link of the side of the other side frame, and a driving link with one end coupled to a front end of the other side connector; and another end of the coupling driving rod with one end coupled to the rotation center of the drive gear is structured to be coupled to another end of the driving link, so as to transmit a rotation force of the drive gear to the driving link via the coupling driving rod.

Preferably, as the driving link, the side connectors, and the coupling driving rod, there are used ones which have stiffness to remain in an elastic deformation region, against an external input that plastically deforms the lower rails or the upper rails close to front ends of the sliders, when the external input is in a predetermined range.

Preferably, a material constituting the side connectors and the driving link is a plate thicker than or a high-stiffness member higher in a second moment of inertia than a material constituting the lower rails or the upper rails of the sliders.

Preferably, the rotation center of the drive gear and the coupling driving rod are provided in a substantially middle position between the front links and the rear links.

Preferably, a crushable zone which deforms relatively easier than a surrounding portion when an external input of a predetermined value or higher is received is set in a vicinity of a belt anchor point in the side frames of the cushion frame unit.

Further, a vehicle seat according to the present invention is a vehicle seat including a seat cushion part and a seat back part, wherein:

the seat cushion part includes a cushion frame unit supporting a cushion member for the seat cushion part;

a left side frame and a right side frame constituting the cushion frame unit are coupled respectively, via a lifter mechanism, to a left slider and a right slider, which constitute the seat slide device, to be supported thereon; and as the lifter mechanism, any one of the above-described lifter mechanisms is used.

Preferably, the seat back part includes a back frame unit supporting a cushion member for the seat back part and coupled to the cushion frame unit and a head rest provided on an upper portion of the back frame unit;

a two-dimensional or three-dimensional fabric is bridged with a stretch rate of 5% or lower across middle portions in an upward and downward direction of a pair of side frames of the back frame unit; and when a force in a direction to tilt the back frame unit rearward operates by an external input of a predetermined value or higher, the head of a seated person is supported by the head rest and the chest enters a frame of the pair of side frames and is supported by the fabric.

Preferably, the pair of side frames of the back frame unit have a predetermined width and provided so that a direction of the width is along a forward and backward direction of the vehicle seat, and an upper frame supporting the head rest and a lower frame disposed between lower portions of the side frames are both provided on sides of rear edge portions of the side frames, and the fabric is bridged across front edge portions of the side frames.

Preferably, the fabric is bridged across positions including a range corresponding to a vicinity of the chest of the seated person.

Preferably, a lumbar support part including a spring member is provided between lower portions of the pair of side frames of the back frame unit and below the fabric.

Effect of the Invention

According to the present invention, while a lifting driving part is provided on one side frame, a coupling driving rod is coupled to a rotation center of a drive gear thereof, a driving link is disposed on a side of the other side frame, and the driving link is coupled to the coupling driving rod. Accordingly, a driving force in the lifting driving part operates on the side of one side frame having the drive gear, but on the side of the other side frame, the driving link rotates together with the drive gear via the coupling driving rod, so as to perform a lifting or lowering operation by a driving force thereof. Thus, despite that it is a structure in which the lifting driving part is provided only on the side of the one side frame, the driving force operates on the side of the other side frame, which is different from the structure in which the other side frame merely follow the lifting or lowering operation of the one side frame as in Patent Document 1. Therefore, similarly to the case where the lifting driving part is provided on the both sides, the lifting or lowering operation is performed smoothly without losing a balance between the left and right side frames. On the other hand, as compared with the case where the lifting mechanism part including a drive gear and so on is provided on the both sides, the structure is simple and enables cost reduction.

Further, one side has the drive gear of the lifting driving part and one side connector disposed between the drive gear and a rear link to couple them, and the other side has a driving link and another side connector disposed between the driving link and a rear link to couple them, where a quadric crank chain mechanism is formed on each of the sides. Thus, deformations during a collision can be absorbed and suppressed by movements of the quadric crank chain mechanisms. Further, in this structure, rotation centers of the drive gear and the driving link are coupled to each other by the coupling driving rod. Therefore, a triangle of force coupling three points of the drive gear, the rear link on one side, and the driving link located on the other side and a triangle of force coupling three points of the driving link located on the other side, the rear link on one side, and the rear link on the other side are formed sharing a hypotenuse, and when they are combined, one virtual square with their hypotenuses being diagonal lines in plan view is formed. Then, they are formed separately from a pair of side frames and inside the pair of side frames. More preferably, even against an external input of a predetermined value or higher that plastically deforms lower rails and upper rails in the vicinities of the front ends of the sliders, one with high stiffness which makes the external input remain in an elastic deformation region when the external input is in a predetermined range is employed as the driving link, the side connectors, and the coupling driving rod, and also the lifting driving part, the driving link, and the coupling driving rod are disposed to exist in middle between the front link and the rear link.

Therefore, a force attempting to lift the front edge side of the vehicle seat upward by an external input at a time of rear collision, in the case of the structure of Patent Document 1, operates as a force to lift the front end of the side frame on one side supporting the lifting driving part from a slider front end because the drive gear of the lifting driving part is disposed only on the side frame on the one side. On the other hand, according to the present invention, since the stiffness of the above-described virtual square combining the two triangles of forces is high, the natural frequency in a lateral direction of the cushion frame increases more than in conventional ones, flexural stiffness in a lateral direction and torsional stiffness become high, and forces operate mainly on the drive gear, the driving link, and the coupling driving rod of the lifting driving part supporting a trunk barycenter portion. Accordingly, the position of an operating point with respect to the external input becomes shorter in the present invention, and the lifting force at the operating point becomes small. Moreover, the above-described high-stiffness virtual square is maintained, and thus the force is dispersed evenly to left and right and is also dispersed to front and rear. Thus, an upward deformation on the front edge side is suppressed, a downward deformation on the rear edge side is also suppressed, and since the plural link mechanisms are combined, deformation speeds of them are alleviated and equalized by rotational friction forces and the like at these pivotal support points.

Consequently, there is prevented a rebound phenomenon such that when an impact force (external input) of a predetermined value or higher operates in a rear collision or the like, the head once contacts the head rest and thereafter separates again from the head rest. The state of contacting the head rest is maintained longer, and a neck injury is improved more than in conventional cases.

Further, preferably, in this structure, a two-dimensional or three-dimensional fabric is bridged with a stretch rate of 5% or lower across middle portions in an upward and downward direction of the pair of side frames of the back frame unit. Accordingly, when a force in a direction to tilt the back frame unit rearward operates by an external input force of a predetermined value or higher, the head of the seated person contacts the head rest, but at this time the chest enters the frame of the pair of side frames while being supported by the fabric. Thus, an acceleration difference and a speed difference between the head and the chest of the seated person can be made small, and a neck injury can be improved further. Further, the lumbar is received by the lumbar support part, and a shock is alleviated by an inward bending deformation of the pair of side frames.

BRIEF DESCRIPTION OF DRAWINGS

FIG. 10 are diagrams illustrating results of a rear collision neck protection performance test, in which FIG. 10(a) is a diagram illustrating test results of this embodiment, and FIG. 10(b) is a diagram illustrating test results of this embodiment and comparative example 1 in a graph.

DESCRIPTION OF EMBODIMENTS

Figure 1:
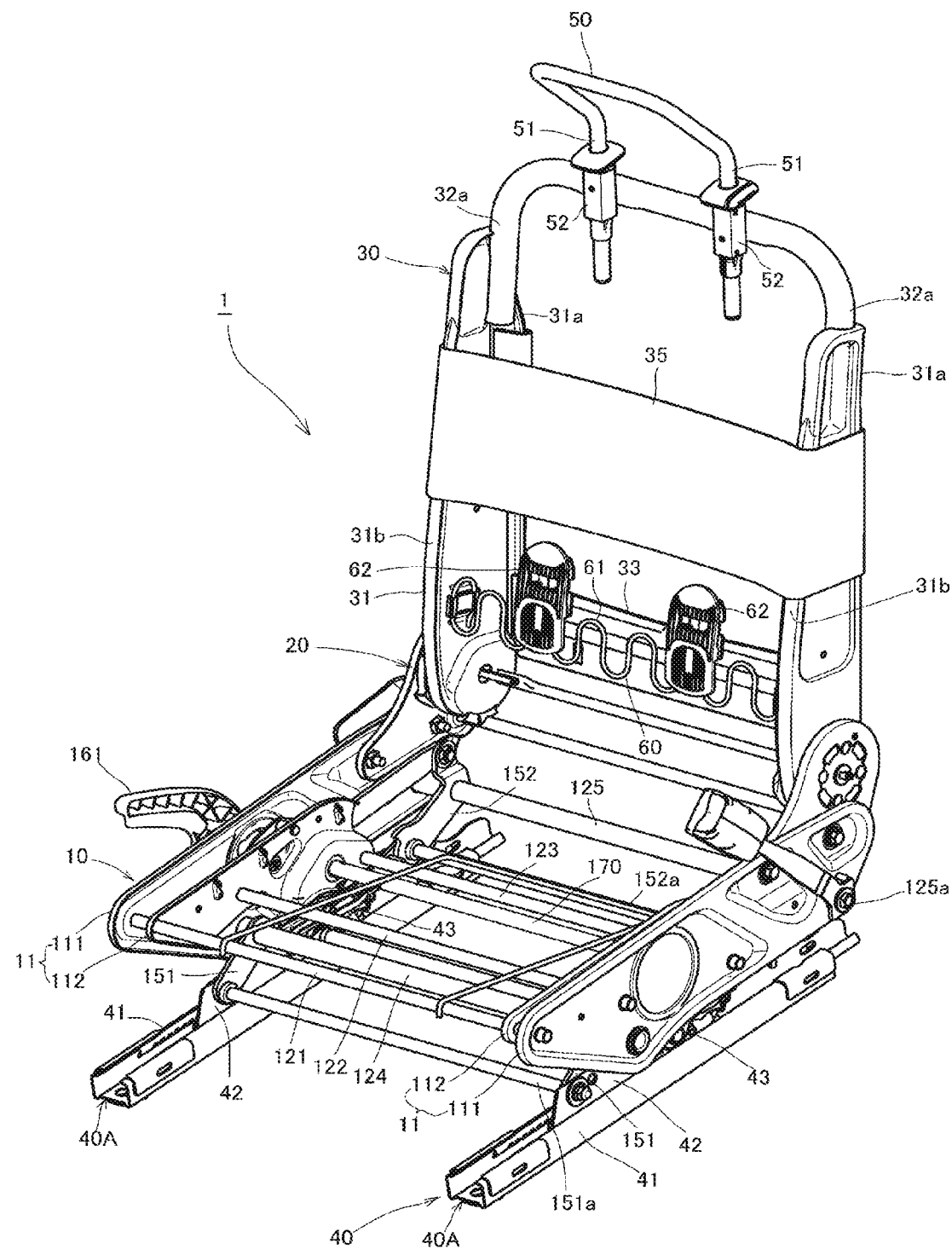
FIG. 1 is a perspective view illustrating a cushion frame unit and a back frame unit of a vehicle seat according to one embodiment of the present invention.

Hereinafter, the present invention will be described in further details based on embodiments illustrated in drawings. FIG. 1 to FIG. 7 are views illustrating a cushion frame unit 10 constituting a seat cushion part and a back frame unit 30 constituting a seat back part of a vehicle seat 1 according to one embodiment of the present invention.

The cushion frame unit 10 is structured to have two side frames 11, 11 supported respectively by upper frames 42, 42 disposed to the left and right of the seat slide device 40. The respective side frames 11, 11 are structured to have two internal and external plate-shaped frames, outer plate-shaped frames 111, 111 and inner plate-shaped frames 112, 112. The outer plate-shaped frames 111, 111 are formed using a plate-shaped member having a predetermined length and width, and disposed so that its length direction is along a forward and backward direction and its width direction is along an upward and downward direction. The inner plate-shaped frames 112, 112 are formed using a plate-shaped member shorter in both length and width than the outer plate-shaped frames 111, 111, and are disposed close to front edges of the outer plate-shaped frames 111, 111 in their entirety.

In a range where the outer plate-shaped frames 111, 111 and the inner plate-shaped frames 112, 112 overlap when seen from a side, plural beams 121 to 124 are bridged over. Specifically, there are bridged a first beam 121 close to front portions of the inner plate-shaped frames 112, 112 and close to upper portions thereof, a second beam 122 in the vicinity of substantially centers in the forward and backward direction of the inner plate-shaped frames 112, 112 and slightly closer to the upper portions thereof than substantially centers in the upward and downward direction, a third beam 123 in the vicinity of rear portions in the forward and backward direction of the inner plate-shaped frames 112, 112 and close to lower portions in the upward and downward direction, and a fourth beam 124 in the vicinity of the substantially centers in the forward and backward direction of the inner plate-shaped frames 112, 112 and closer to the lower portions than the second beam 122.

In these beams 121 to 124, the vicinities of ends in a longitudinal direction are fixed by penetrating the inner plate-shaped frames 112, 112 and further penetrating the outer plate-shaped frames 111, 111 in the thickness direction. Therefore, both the pairs of the inner plate-shaped frames 112, 112 and the outer plate-shaped frames 111, 111 (side frames 11, 11) which are disposed to the left and right respectively are structured to be supported by two positions between portions in the beams 121 to 124 penetrating the inner plate-shaped frames 112, 112 and the outer plate-shaped frames 111, 111. Thus, a force applied by impact and vibration is transmitted in a manner dispersed in a good balance to the inner plate-shaped frames 112, 112 and the outer plate-shaped frames 111, 111 on the left and right.

Since the outer plate-shaped frames 111, 111 and the inner plate-shaped frames 112, 112 are of such a two-position support structure, the range in which the both overlap when seen from a side becomes a part of high stiffness in the forward and backward direction as compared to material states of the outer plate-shaped frames 111, 111 or the inner plate-shaped frames 112, 112, and thus has high strength. Further, the vicinities of the ends of the respective beams 121 to 124 providing the two-position support also become a high-stiffness part having relatively high stiffness compared to center parts thereof. Note that, in order to maintain high stiffness of the parts of the outer plate-shaped frames 111, 111 and the inner plate-shaped frames 112, 112 in such a range where they overlap with each other, preferably, at least two beams are disposed in this range at well balanced positions with predetermined gaps in front and rear, or more preferably, four beams 121 to 124 are disposed as in this embodiment.

Rear portions of the outer plate-shaped frames 111, 111 do not overlap with the inner plate-shaped frames 112, 112 when seen from a side, but a fifth beam 125 is bridged across the opposing rear portions of the outer plate-shaped frames 111, 111. The fifth beam 125 is fixed by penetrating rear links 152, 152 constituting a lifter mechanism part which will be described later, and thereafter fixed by penetrating the rear portions of the outer plate-shaped frames 111, 111. Therefore, also the vicinities of ends of the fifth beam 125 provide a two-position support structure supporting the rear links 152, 152 and the outer plate-shaped frames 111, 111, and this part also is a high-stiffness part having relatively high stiffness.

Here, preferably, an end of the fifth beam 125 which is exposed on an outer surface of the outer plate-shaped frames 111, 111 is an anchor attaching part (belt anchor point) 125*a* supporting a belt anchor part of a seat belt. When the anchor attaching part for a seat belt is provided on the seat slide device 40, the degree of fastening of the seat belt changes when the cushion frame unit 10 moves upward or downward by a lifting driving part 160. However, as in this embodiment, when the anchor attaching part 125*a* of the seat belt is the end of the fifth beam 125, the degree of fastening of the seat belt becomes constant irrespective of upward or downward movement of the cushion frame unit 10. Note that although the anchor attaching part 125*a* of the seat belt may be any high-stiffness part in the vicinity of a rear part of the cushion frame unit 10 and is not limited to an end of the fifth beam 125, it is desired to use the fifth beam 125 in the structure of this embodiment.

The cushion frame unit 10 is disposed via the lifter mechanism part of this embodiment to upper rails 42, 42 of the seat slide device 40 attached to the left and right at a predetermined interval on a floor. Specifically, the lifter mechanism part of this embodiment has front links 151, 151 and rear links 152, 152 provided on the left and right respectively corresponding to the left and right side frames 11, 11, and has a lifting driving part 160 on a side of one side frame 11.

One ends (lower ends) of the left and right front links 151, 151 are pivotally supported on respective ends of a shaft member 151*a* bridged over close to front sides of the upper rails 42, 42 of the seat slide device 40. Other ends (upper ends) of the front links 151, 151 are pivotally supported inside of respective coupling positions to the inner plate-shaped frames 112, 112 on the fourth beam 124.

One ends (lower ends) of the left and right rear links 152, 152 are pivotally supported on respective ends of a shaft member 152*a* bridged over close to rear sides of the upper rails 42, 42 of the seat slide device 40. Other ends (upper ends) of the rear links 152, 152 are pivotally supported inside of respective coupling positions to the inner plate-shaped frames 112, 112 on the fifth beam 125, as described above.

The left and right rear links 152, 152 each have an extending portion 152*b*, 152*b* extending further upward of the coupling position to the fifth beam 125, and each of side connectors 153 included in the lifter mechanism part is pivotally supported on one of the extending portions 152*b*, 152*b*.

The lifting driving part 160 is provided in a position slightly closer to a front side than a center portion in the forward and backward direction on one side frame 11 (right side in this embodiment). Specifically, an attachment part 160*a* constituted of a flange projecting outward is fixed to a base of the lifting driving part 160 on the inner plate-shaped frame 112, and a main body part 160*b* having a brake mechanism for stopping a rotating operation at any position is disposed to project outward via a through hole 111*a* formed in the adjacent outer plate-shaped frame 111 (see FIG. 7). To the main body part 160*b* projecting outward via the through hole 111*a*, an operating part 161 is connected (see FIG. 1 and FIG. 2), and when the operating part 161 is operated, an output gear 160*c* of the lifting driving part 160 located between the outer plate-shaped frame 111 and the inner plate-shaped frame 112 rotates. Between the outer plate-shaped frame 111 and the inner plate-shaped frame 112 is disposed a drive gear 160*d* constituted of a sector gear in a substantially fan shape meshing with the output gear 160*c* and transmitting the driving force thereof. The drive gear 160*d* is provided rotatably about a support shaft 160*e* bridged across the outer plate-shaped frame 111 and the inner plate-shaped frame 112 (see FIG. 5). Within a plane of the drive gear 160*d*, a front end portion of one side connector 153 is pivotally supported via a pin 160*f* at a position separated by a predetermined distance from the support shaft 160*e* as a rotation center, and in response to a rotation of the drive gear 160*d*, the front end portion of the one side connector 153 is displaced substantially forward or backward about the rotation center of the drive gear 160*d*, to thereby change an inclination of one rear link 152.

The lifter mechanism part of this embodiment is structured to have a coupling driving rod 170 and a driving link 171 in addition to the respective components including the left and right front links 151, 151, the left and right rear links 152, 152, the left and right side connectors 153, 153, and the lifting driving part 160 which are described above. The coupling driving rod 170 has one end 170*a* disposed to be coupled to the support shaft 160*e* which is the rotation center of the drive gear 160*d*. The driving link 171 has an upper end portion pivotally supported rotatably on a front end portion of the other side connector 153 via a shaft member 171*a*. Then, the other end 170*b* of the coupling driving rod 170 and a lower end portion of the driving link 171 are coupled. Thus, when the drive gear 160*d* rotates, the coupling driving rod 170 rotates together with the support shaft 160*e*, this rotation force is transmitted to the driving link 171, and the driving link 171 pivots in the forward and backward direction about its lower end portion. Therefore, on the side of the one side frame 11, the front end portion of the one side connector 153 is displaced forward or backward about the rotation center of the drive gear 160*d* in response to the rotation of the drive gear 160*d* as described above. Also on the side of the other side frame 11, the driving link 171 pivots forward or backward about the lower end portion via the coupling driving rod 170, and thus the other side connector 153 is displaced forward or backward about the rotation center of the driving link 171.

Specifically, with the lifter mechanism part of this embodiment, despite that the lifting driving part 160 is just disposed on the side of the one side frame 11 only, owing to having the coupling driving rod 170 and the driving link 171, the other side connector 153 is displaced by the rotation force of the driving link 171 also on the side of the other side frame 11, and thereby the rear link 152 and the front link 151 on the side of the other side frame 11 are displaced. Therefore, a force causing the lifting or lowering operation of the left and right front links 151, 151 and rear links 152, 152 operates substantially evenly to left and right, and thus the lifting or lowering operation of the side frames 11, 11 with respect to sliders 40A, 40A is performed smoothly.

Further, each of the left and right side frames 11, 11 is the two-position support structure by the outer plate-shaped frames 111, 111 and the inner plate-shaped frames 112, 112 as described above, and the left and right side frames 11, 11 coupled by the coupling driving rod 170 are in the two-position support structure with each other. That is, the cushion frame unit 10 has a substantially symmetrical structure being bilaterally substantially symmetrical and also has the two-position support structure, is thereby capable of receiving a force in a bilaterally balanced manner and also exhibiting high stiffness, and thus has a high deformation preventing function at a time of collision. This increases the natural frequency in a lateral (bilateral) direction of the cushion frame unit 10.

Here, each of the sliders 40A, 40A of the seat slide device 40 is structured to include a lower rail 41, 41 and an upper rail 42, 42. The lower rail 41, 41 is formed with a substantially U-shaped cross section which has a bottom plate portion and two side plate portions and also has two top plate portions projecting in mutually opposing directions between upper portions of the side plate portions opposing each other. The upper rail 42, 42 relatively moving inside the lower rail 41, 41 is formed with a substantially reverse T-shaped cross section, and the sliders 40A, 40A are formed in shapes to be bilaterally symmetrical to each other. Further, a lock mechanism 43 which fixes a relative position of the upper rail 42, 42 with respect to the lower rail 41, 41 is provided on each side of a vertical wall portion 421, 421 of each upper rail 42, 42. Thus, lock claws of the lock mechanisms 43, 43 at symmetrical positions across the vertical wall portion 421, 421 of each upper rail 42, 42 engage with engaged parts of the lower rail 41, 41. That is, the posture in a state that the lock claws are engaged and the operating direction of an engagement force while locking is also substantially bilaterally symmetrical, and thus an unbalanced load while locking is difficult to occur. From these facts, the seat slide device 40 is structured such that an external input can easily disperse substantially evenly to left and right, and has a structure for which it is possible to use a material thinner than conventional ones, for example, a material with a plate thickness of 1.8 mm or less, preferably in the range of 0.6 to 1.6 mm as a material for making the lower rails 41, 41 and the upper rails 42, 42.

On the other hand, in order to resist a predetermined external input when the stiffness of the sliders 40A, 40A is lowered in this manner, it is necessary to ensure that a force is transmitted in a dispersed manner to the sliders 40A, 40A. For this purpose, the lifter mechanism part which is an upper structure thereof needs to be a structure which has a higher resistance against the external input than the sliders 40A, 40A, and is capable of transmitting a force substantially evenly to left and right and front and back to the sliders 40A, 40A while maintaining its shape against an external input in a predetermined range.

Accordingly, preferably, the driving link 171, the side connectors 153, 153 and the coupling driving rod 170 constituting the lifter mechanism part are made from a material having stiffness of a predetermined value or higher. Note that the drive gear 160*d* of the lifting driving part 160 typically has high stiffness, and thus the stiffness of this drive gear 160*d* is originally of the predetermined value or higher. The stiffness of a predetermined value or higher means stiffness sufficient for that, even against an external input that plastically deforms the lower rails 41, 41 or the upper rails 42, 42 close to the front end of the sliders 40 by a rear collision, when the external input is in a predetermined range, deformations of the driving link 171, the side connectors 153, 153, the coupling driving rod 170, and the drive gear 160*d* remain in an elastic deformation region. Such a characteristic can be obtained by using, for example, a material with a larger plate thickness than the steel constituting the lower rails 41, 41 or the upper rails 42, 42, which is preferably a thickness of 2 mm or more, more preferably 3 mm or more, furthermore preferably 5 mm or more, for the driving link 171, the side connectors 153, 153, and the drive gear 160*d*. Further, it is also possible to use one with a high second moment of inertia to make a high-stiffness member. The coupling driving rod 170 can also be obtained by selecting a steel pipe having a predetermined stiffness. Thus, the natural frequency in the lateral (left and right) direction of the cushion frame 10 becomes higher, and when the external input is in a predetermined range, the shape of a virtual square coupling contact points of the driving link 171, the side connectors 153, 153, the coupling driving rod 170, and the drive gear 160*d* (one formed by, as described above, triangles of two forces sharing a hypotenuse) does not collapse, and the external input can be transmitted substantially evenly to left and right and front and rear of the sliders 40, 40.

Next, the operation of this embodiment will be described. First, by a rear collision, when its impact force (external input) operates as a force to lift the portions of the upper rails 42, 42 close to the front end with respect to the lower rails 41, 41, the substantially reverse T-shaped cross section of the upper rails 42, 42 deforms in an extending direction, and also the substantially reverse U-shaped cross section of the lower rails 41, 41 also attempts to deform in the extending direction. In this case, in the above-described structure, deformations are absorbed and suppressed by movements of a quadric crank chain mechanism of one side constituted of the drive gear 160*d* and one side connector 153 disposed between the drive gear 160*d* and the rear link 152 to couple them, and of a quadric crank chain mechanism of the other side constituted of the driving link 171 and another side connector 153 disposed between this driving link 171 and the rear link 152 to couple them. Further, the shape of the virtual square coupling contact points of the driving link 171, the side connectors 153, 153, the coupling driving rod 170, and the drive gear 160*d* does not collapse, and the forces concentrate particularly on the drive gear 160*d* with high stiffness. Thus, a force due to barycenter movement of the trunk is received in a dispersed manner by the coupling driving rod 170 coupled directly to the drive gear 160d and the driving link 171. As a result, the forces to lift the portions close to the front end of the upper rails 42, 42 with respect to the lower rails 41, 41 can be suppressed, and accordingly the downward displacement amount of rear portions of the side frames 11, 11 can be suppressed.

Moreover, since the positions of disposing the drive gear 160d, the coupling driving rod 170, and the driving link 171 where the forces concentrate are between the front links 151, 151 and the rear links 152, 152, and are preferably disposed in substantially middle positions therebetween, the distance from a power point of the external input at a time of rear collision to an operating point becomes short as compared with the conventional structure not having the coupling driving rod 170. This point also contributes to decreasing the lifting force for the upper rails 42, 42 and suppressing the downward displacement amount of rear portions of the side frames 11, 11.

Further, the above-described virtual square, which serves a large function for receiving an external input, coupling contact points of the driving link 171, the side connectors 153, 153, the coupling driving rod 170, and the drive gear 160d is, on the side of one side frame 11, a link mechanism in which the one side connector 153, the one rear link 152, and the drive gear 160d are pivotally supported with each other, and on the side of the other side frame 11, a link mechanism in which the other side connector 153, the other rear link 152, and the driving link 171 are pivotally supported with each other. That is, this is a structure with a plurality of pivotal support points besides pivotal supports point between the front links 151, 151 and the rear links 152, 152 and the side frames 11, 11 supported by them. Therefore, the force applied to the cushion frame unit 10 is dispersed as described above, and energy is absorbed by rotational friction forces at these pivotal support points. Thus, downward deformation speeds of the rear portions of the side frames 11, 11 are buffered and evened, making it difficult for a rapid lowering deformation to occur.

Figure 8:
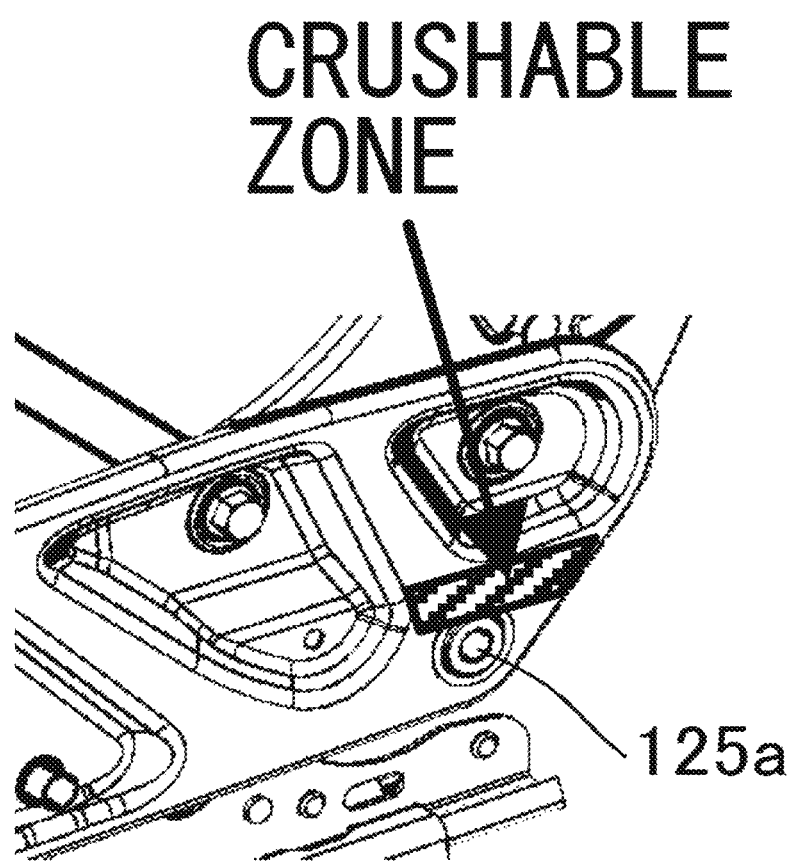
FIG. 8 is a view illustrating the position of a crushable zone.

Further, in a rear portion of the outer plate-shaped frame 111 of a side frame 11 of the cushion frame unit 10, the anchor attaching part (belt anchor point) 125a of a seat belt with high stiffness which is an end portion of the fifth beam 125 is provided. On the other hand, as illustrated in FIG. 8, the vicinity of the anchor attaching part 125a, that is, in this embodiment, a portion immediately above the anchor attaching part 125a is formed by a plane inside of a bent peripheral portion of the outer plate-shaped frame 111, so as to set a crushable zone which deforms relatively easily compared to the surrounding portion thereof. As described above, the force due to barycenter movement of the trunk of a seated person is received by the drive gear 160d with high stiffness and the coupling driving rod 170 coupled directly to the drive gear 160d and the driving link 171, but meanwhile the crushable zone deforms to damp the force and suppress rebound of the seated person, which can ensure a trace of rearward movement of the trunk more reliably.

Thus, by suppressing rapid deformations, a phenomenon that the head position of the seated person is displaced to hit the head rest several times is prevented, and the state in contact with the head rest can be maintained easily, enabling to reduce head injuries.

Figure 2:
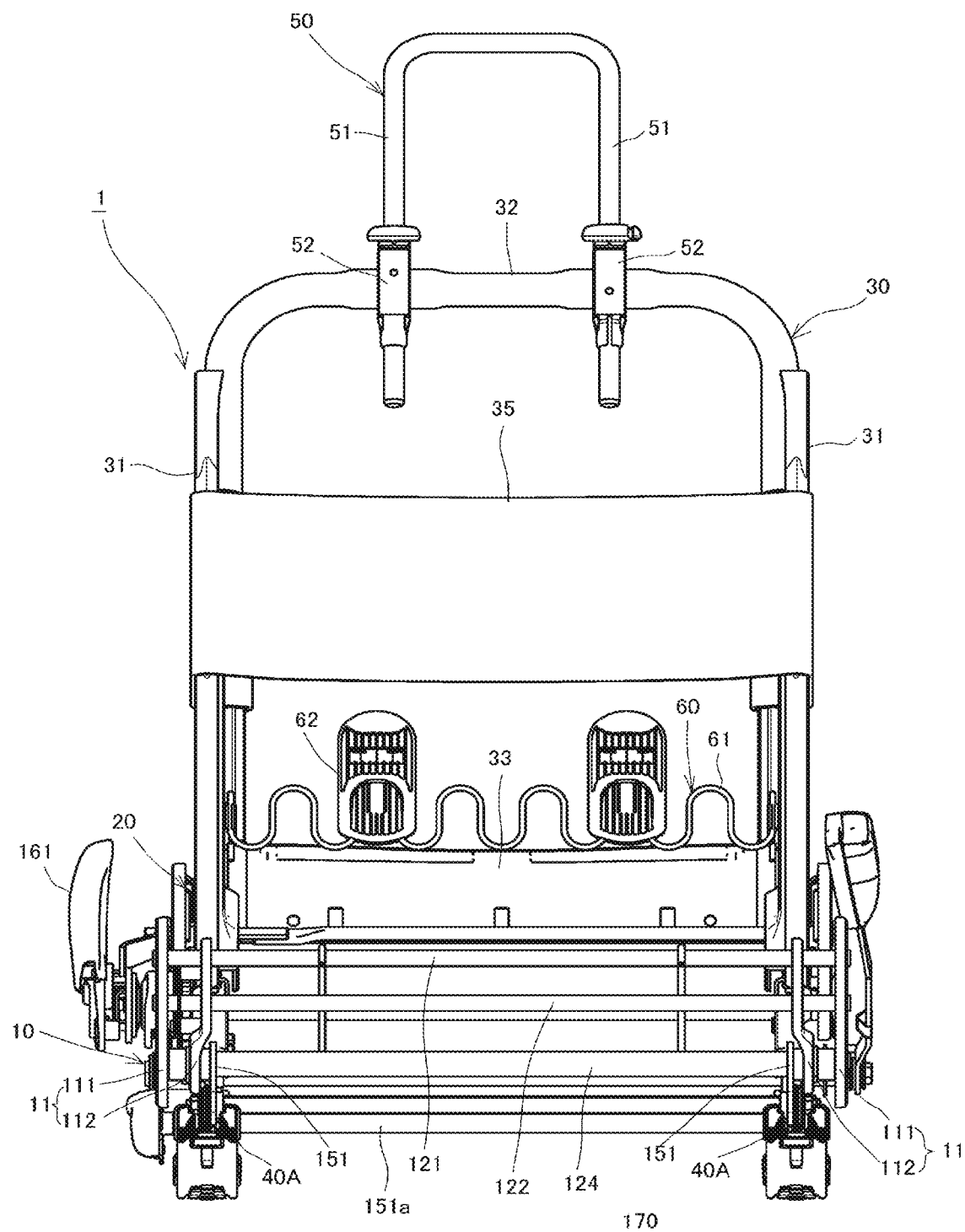
FIG. 2 is a front view of FIG. 1.
Figure 3:
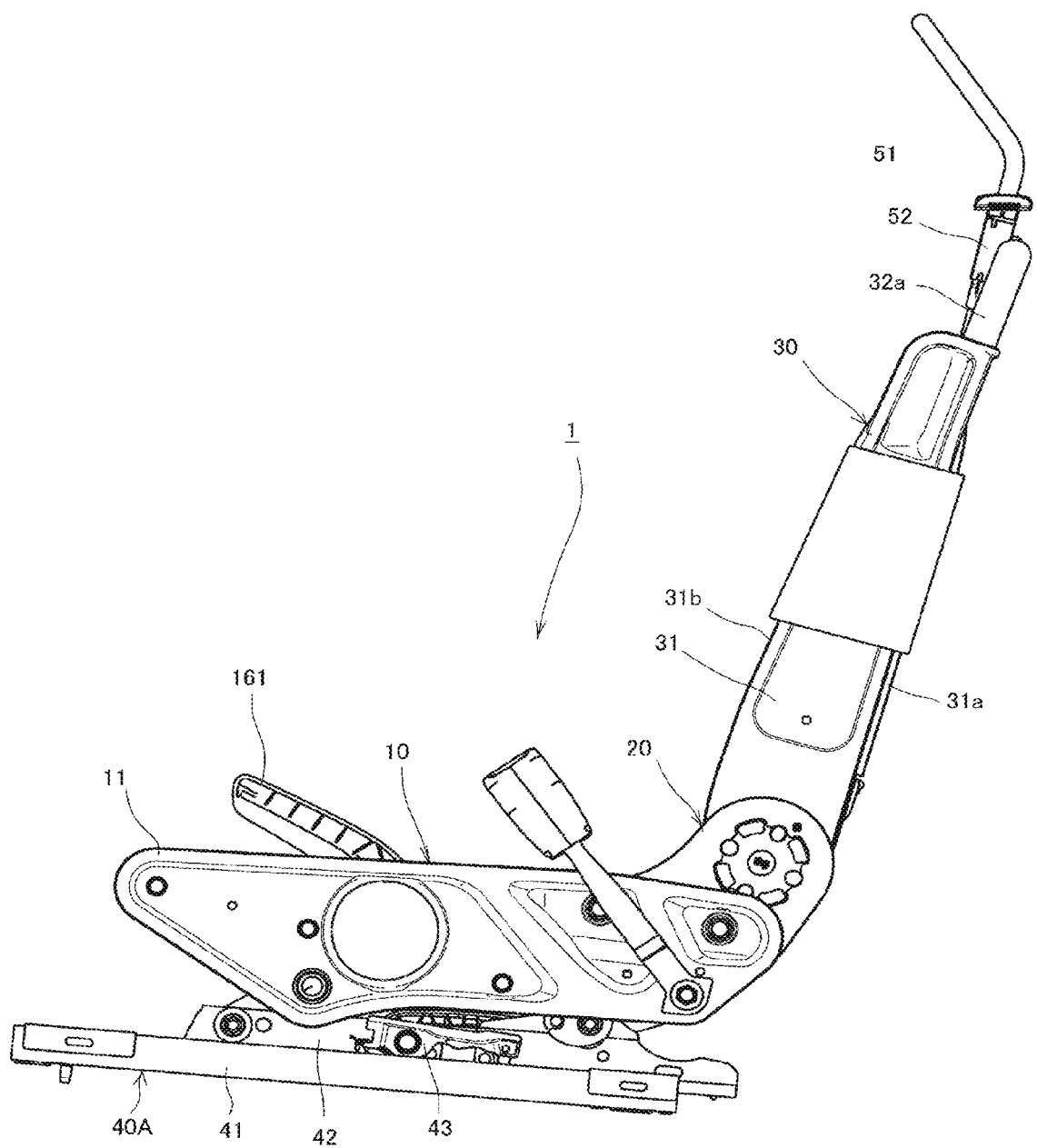
FIG. 3 is a side view of FIG. 1.
Figure 4:
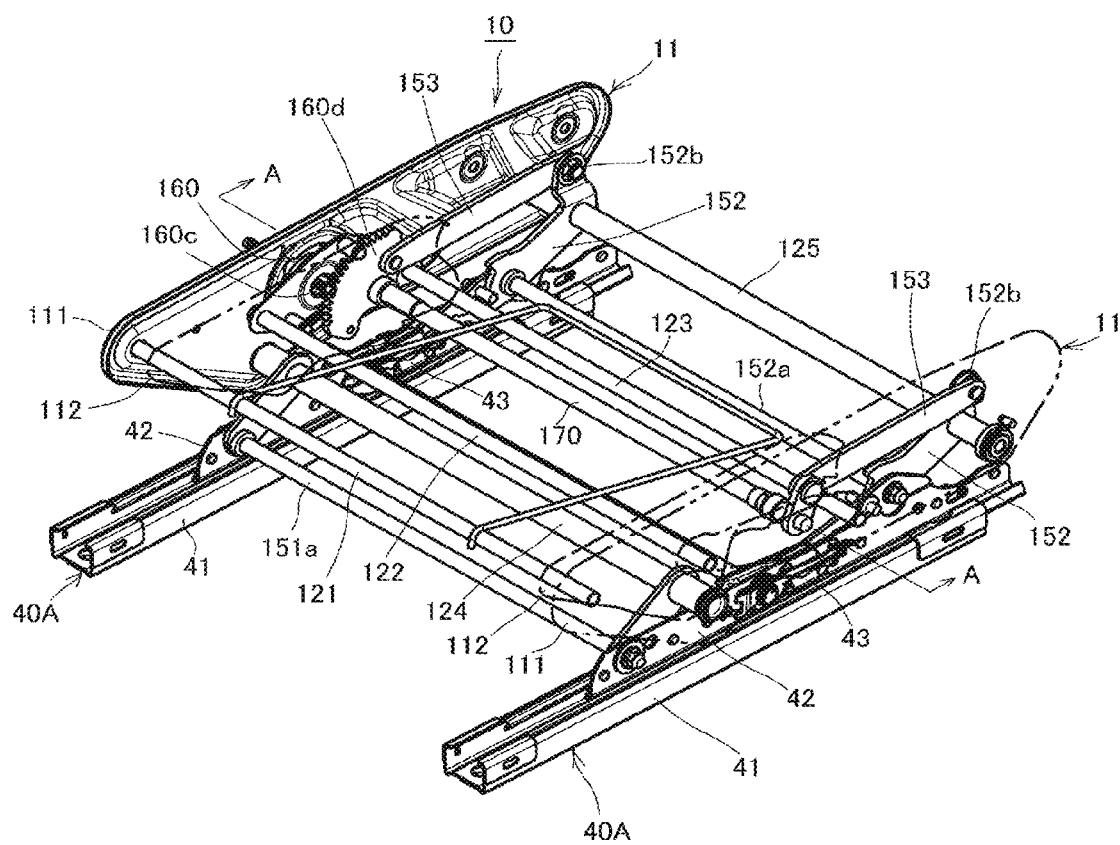
FIG. 4 is a perspective view illustrating a cushion frame unit and a lifter mechanism part using FIG. 1.
Figure 5:
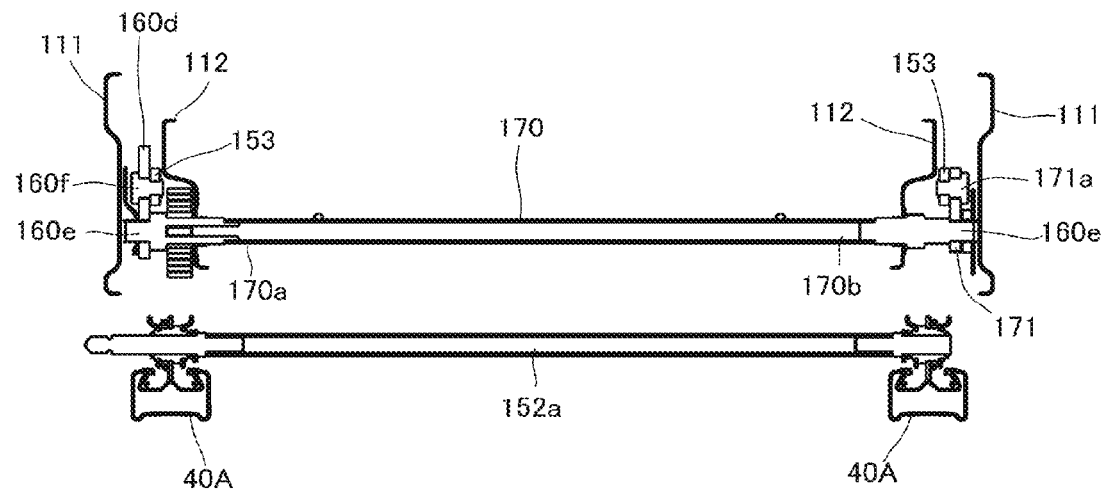
FIG. 5 is a cross-sectional view taken along a line A-A of FIG. 4.
Figure 6:
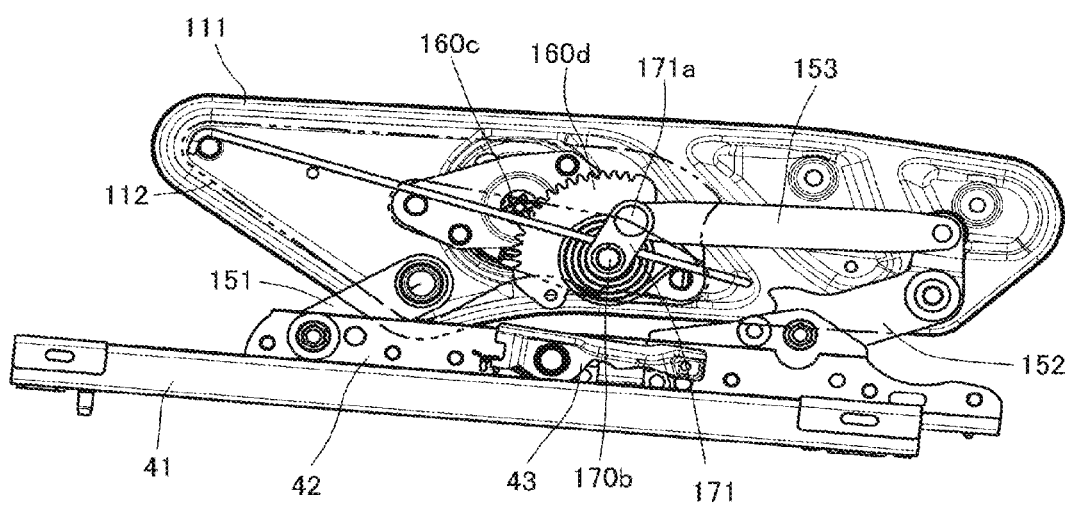
FIG. 6 is a side view of FIG. 4.
Figure 7:
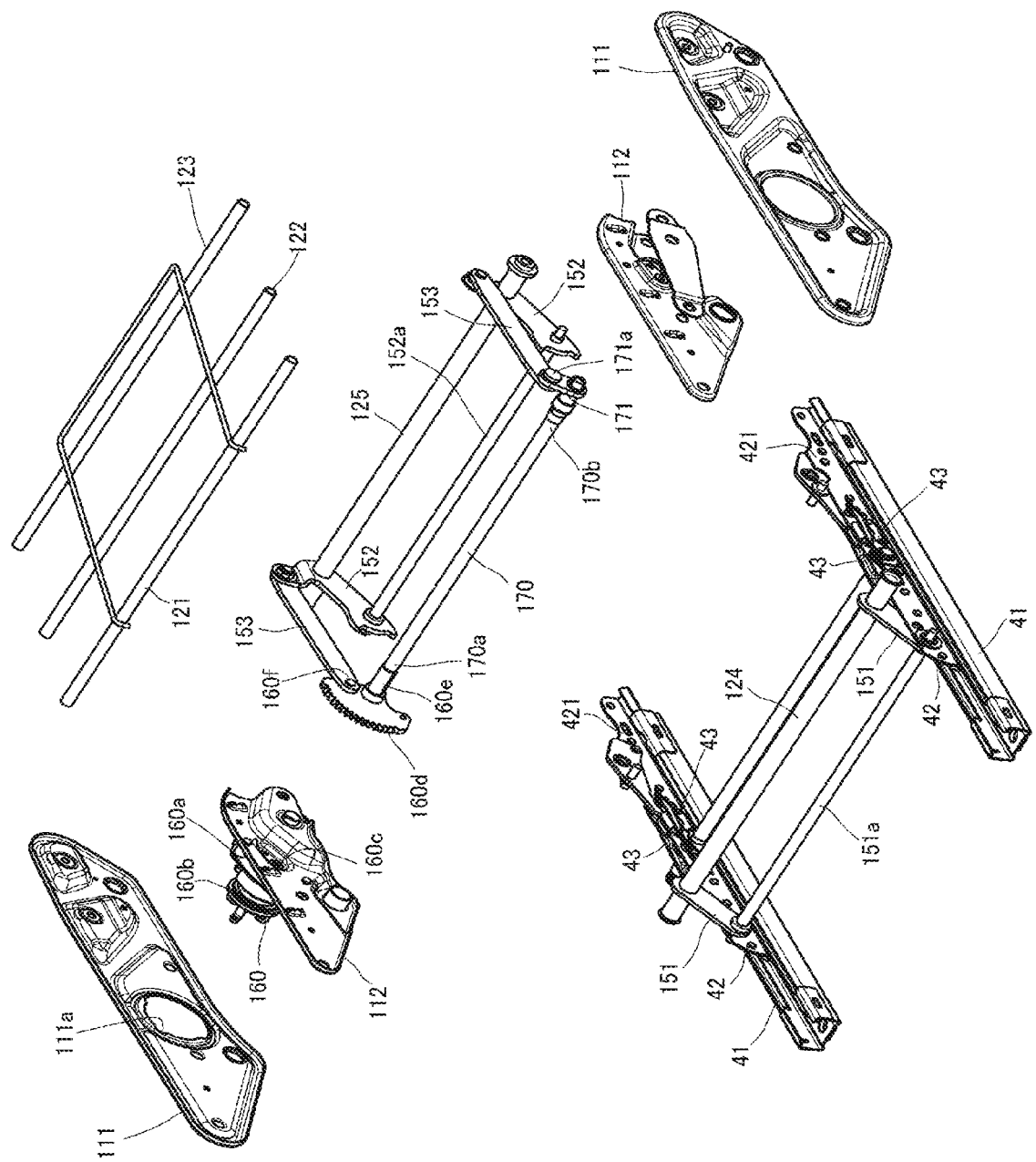
FIG. 7 is an exploded perspective view of FIG. 4.

Next, the back frame unit 30 in the seat back part of the vehicle seat 1 of this invention will be explained. As illustrated in FIG. 1 to FIG. 3, the back frame unit 30 has a pair of side frames 31, 31 disposed at a predetermined interval, an upper frame 32 located between upper portions of the side frames 31, 31, and a lower frame 33 disposed between lower portions of the side frames 31, 31.

Each of the side frames 31, 31 is constituted of a thin plate-shaped member having a predetermined length and width, and are provided so that their width direction is along the forward and backward direction of the vehicle seat 1. The vicinity of a lower portion of this side frame 31, 31 is coupled to the vicinity of a rear portion of each side frame 11, 11 of the cushion frame unit 10 via a reclining unit 20.

The upper frame 32 is constituted of a pipe member formed in a substantially U shape, and has end portions 32a, 32a each welded to a position close to one of rear edge portions 31a, 31a of the side frames 31, 31. The lower side frame 33 is constituted of a thin plate-shaped member similarly to the side frames 31, 31, and a bead portion is formed in a longitudinal direction thereof, making it easy to deform in a substantially chevron shape in plan view by an impact force of a predetermined value or higher. Further, the lower frame 33 is attached by welding between the rear edge portions 31a, 31a of the lower portions of the side frames 31, 31. Further, in a substantially center portion of the lower frame 33, a pair of attachment members 52, 52 for a head rest 50 are provided with a predetermined interval, and there is disposed a pair of head rest poles 51, 51 by inserting into the attachment members 52, 52. The heights of the head rest poles 51, 51 with respect to the attachment members 52, 52 can be adjusted so as to set the head rest 50 at an appropriate position.

Across middle portions in the upward and downward direction of the pair of side frames 31, 31 of the back frame unit 30, preferably in positions including a range corresponding to the vicinity of the chest of the seated person, a two-dimensional or three-dimensional fabric 35 is bridged with a stretch rate of 5% or lower. Preferably, the fabric is bridged in a loose state without stretch. Specifically, the fabric has no tension to support the chest at a normal time, and a tension of a degree to allow supporting the chest when an external input of a predetermined value or higher occurs. By bridging the fabric 35 with a low stretch rate, when a force in a direction to tilt the back frame unit 30 rearward operates by an external input of a predetermined value or higher, the chest of the seated person is allowed to enter the frame of the pair of side frames 31, 31. In this embodiment, as described above, the side frames 31, 31 have a predetermined width, and are attached to the reclining unit 20 so that the direction of the width is along the forward and backward direction of the vehicle seat 1. Accordingly, the fabric 35 is disposed to be bridged across front edge portions 31b, 31b of the side frames 31, 31. The upper frame 32 and the lower frame 33 are provided on the sides of the rear edge portions 31a, 31a of the side frames 31, 31 as described above, and meanwhile the fabric 35 is bridged across the front edge portions 31b, 31b in this manner. Accordingly, when the external input of a predetermined value or higher as described above operates, in the fabric 35, a stroke to be displaced rearward is ensured while supporting the vicinity of the chest of the seated person. That is, in this structure, the vicinity of the chest of the seated person can easily enter the frame of the side frames 31, 31.

Note that symbol 60 denotes a lumbar support. This lumbar support 60 has an S-shaped spring member 61 bridged across the side frames 31, 31 and support plate-shaped frames 62, 62 provided bilaterally symmetrically with a center of this spring member 61 being a boundary.

Since the seat back part of this embodiment has the back frame unit 30 structured as above, when the impact force (external input) of a predetermined value or higher operates by a rear collision, the back around the chest of the seated person attempts to enter the space between the side frames 31, 31. At this time, in the back frame unit 30, no part except the fabric 35 and the lumbar support 60 is disposed in the frame surrounded by the side frames 31, 31, the upper frame 32, and the lower frame 33. Therefore, when the back enters, the vicinity of the chest enters rearward continuously while being supported by the fabric 35.

Here, the side frames 31, 31 of the back frame unit 30 of this embodiment are formed with strength to a degree such that they can be deformed rearward when such an impact force (external input) of a predetermined value or higher operates. Therefore, when the impact force (external input) of a predetermined value or higher operates and the seated person is pushed rearward, a force applied by movement of the lumbar part is buffered by the spring member 61 of the lumbar support 60. Moreover, the seated person enters the frame of the side frames 31, 31 continuously while being supported by the fabric 35, and the side frames 31, 31 are deformed to bend inward continuously while being displaced rearward. This damps the impact force continuously. At this time, although the head of the seated person contacts the head rest 50 but it contacts there while the chest enters, the head and the chest move similarly, and a difference in behavior therebetween becomes small. Thereafter, the side frames 31, 31 are displaced rearward continuously. Then, the lower frame 33 is deformed continuously in a substantially chevron shape in plan view and thus the side frames 31, 31 are deformed to bend inward, and the state that the head is supported by the head rest 50 and the chest is supported by the fabric 35 continues. By this deformation behavior of the back frame unit 30 and the above-described deformation behavior of the cushion frame unit 10, according to this embodiment, forward rebound of the seated person is suppressed, and an acceleration difference between the head and the chest (particularly a difference between first thoracic vertebra forward-backward direction acceleration and head forward-backward direction acceleration) or a speed difference can be made small, and head injuries can thus be reduced.

TEST EXAMPLE 1

Figure 9:
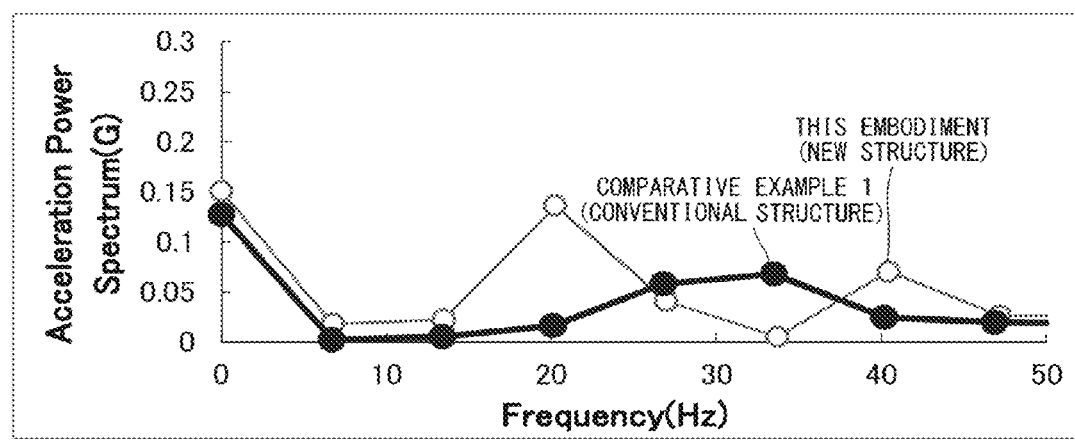
FIG. 9 is a diagram illustrating test results of Test Example 1.
Figure 10:
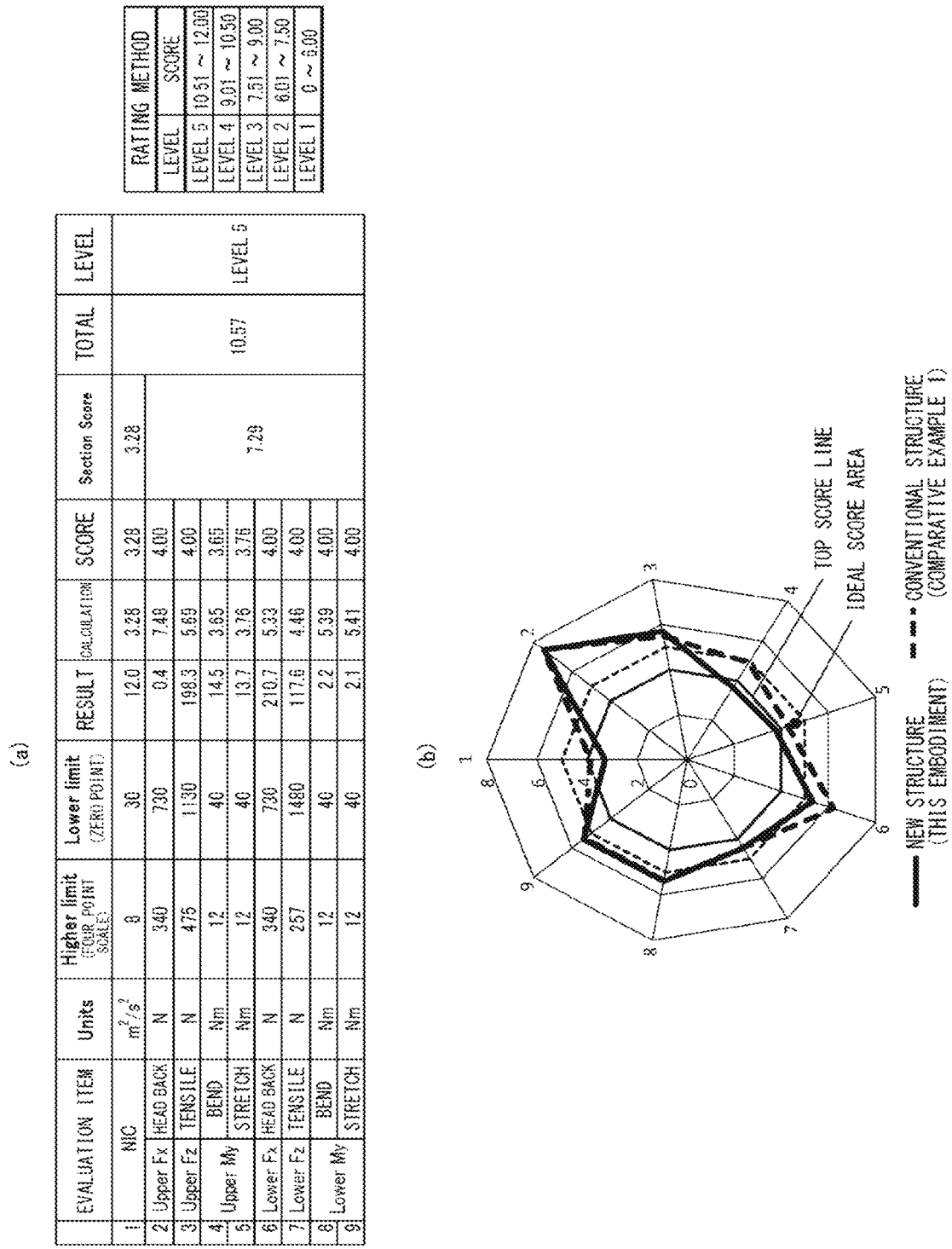

The side frame 11 of the cushion frame unit 10 was laterally hammered to obtain a natural frequency. Results are illustrated in FIG. 9. As illustrated in FIG. 9, the natural frequency of the seat with the new structure according to this embodiment is about 40 Hz (note that the peak of about 20 Hz is the natural frequency of the sliders). Further, when a similar test was performed on a cushion frame unit with a conventionally structure which is what is called a both-side lock structure in which the lifting driving part of the lifter mechanism part is provided on each of the side frames on the both sides (comparative example 1), the natural frequency was about 34 Hz. Therefore, according to this embodiment, it was indicated that the natural frequency of the seat becomes high according to this embodiment.

TEST EXAMPLE 2

The rear collision neck protection performance test defined in JNCAP (Japan New Car Assessment Program) was performed. Specifically, a BioRID II dummy was used to fix the seat on a test apparatus, pulses of impact when subjected to a rear collision were reproduced and added, and a value of Neck Injury Criterion (NIC) was obtained as an injury index evaluating "S-shaped deformation of neck" occurring in a period until the head contacts the head rest (phase 1). Further, a neck load-moment is measured as an injury index evaluating in a period after the contact until "maximum backbend" (phase 2) and is scored on a four point scale using a score conversion function used in automobile assessment in Europe and the United States, or the like, points are added to this point by multiplying by a weight coefficient taking a situation of accident into consideration, a total score is calculated, and an evaluation is made by this total score. Note that the vehicle seat used in the test is one having the cushion frame unit 10 including the lifter mechanism part of this embodiment illustrated in FIG. 4 to FIG. 7. Further, an upward-downward displacement amount by the lifter mechanism part is 50 mm at full stroke, and upon the test it was set to 25 mm of an intermediate position thereof.

Figure 11:
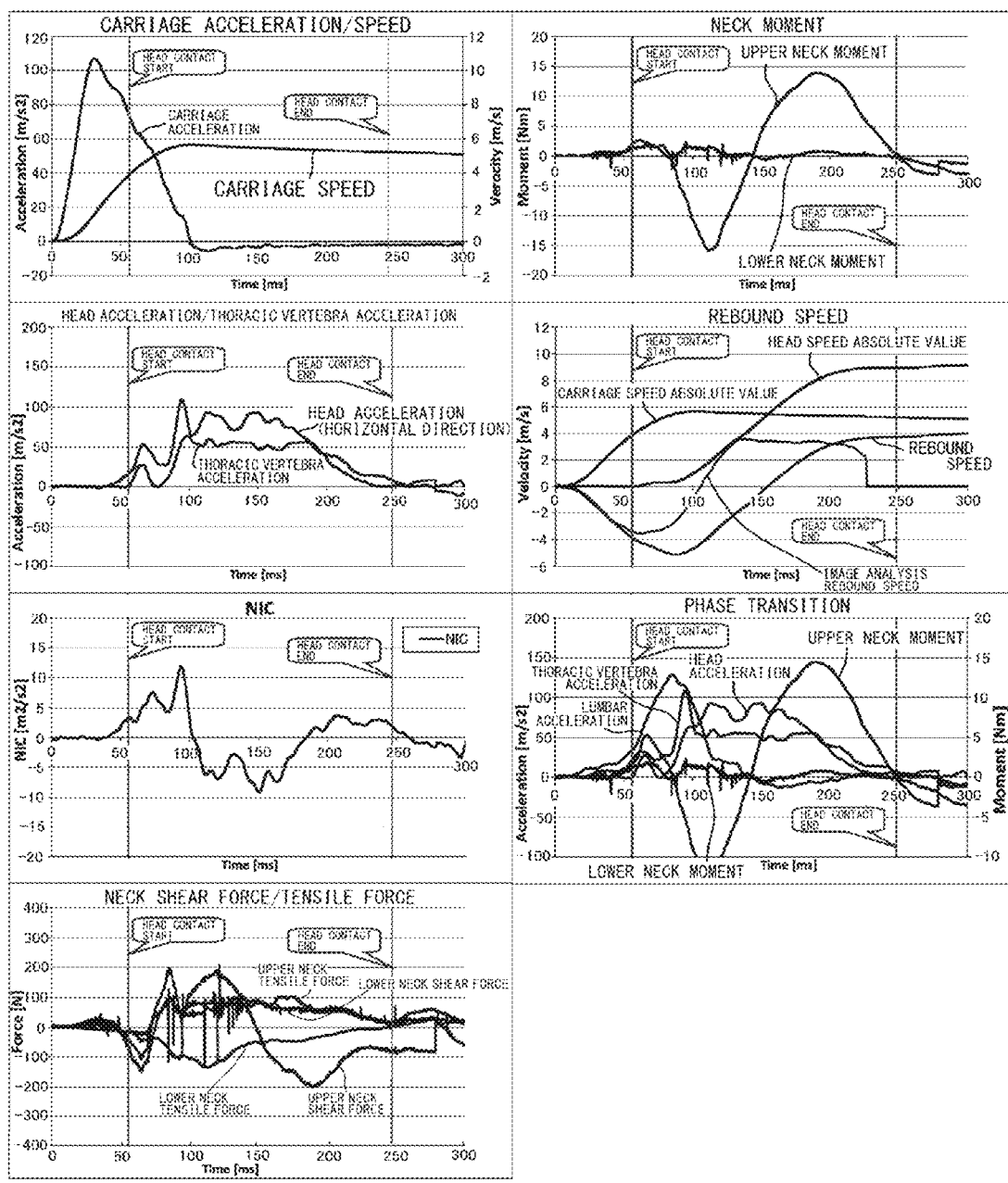
FIG. 11 is a diagram illustrating, in graphs with a horizontal axis being a time axis, various data of carriage accelerations and speeds in the rear collision neck protection performance test as well as test results of this embodiment illustrated in FIG. 10.

Results are illustrated in FIG. 10 to FIG. 15. FIG. 10(a) and FIG. 11 illustrate carriage accelerations and speeds at the time of test as well as test results in a graph. Further, a similar test was performed for above-described comparative example 1, and FIG. 10(b) illustrates test results of this embodiment and comparative example 1 in a graph. In this graph, the numbers 1 to 9 in a circumferential direction are the numbers of evaluation items of FIG. 10(a), and numeric values of 1 to 8 in a radial direction are numeric values in the field of "calculation" of FIG. 10(a). In this graph, it is considered preferable when the entire shape is approximate to "maximum points line", and in this view point, the line of this embodiment depicted with a bold solid line can be said as more idealistic than the line of comparative example 1 depicted with a bold dashed line. The score of NIC was 3.28, the scores of neck load/moment were such that a moment rotating around the leftward-rightward axis of a neck upper portion is 3.65 on a bend side and 3.76 on an expansion side, and the others are all 4.00. Then, the comprehensive evaluation was 10.57 points, which was the highest evaluation at level 5. Note that in this embodiment, the value of NIC was below the maximum point, which is conceivably because the back frame unit 30 deformed early due to a crushable zone which is provided in the cushion frame unit 10 for suppressing rebound of the dummy. Note that in the Table of FIG. 10(a), "Upper" means the "neck upper portion", and "Lower" means a "neck lower portion", "Fx" means a "shear load (head back direction)", "Fz" means a "tensile load (upward direction)", and "My" means "leftward-rightward direction axial moment".

Figure 12:
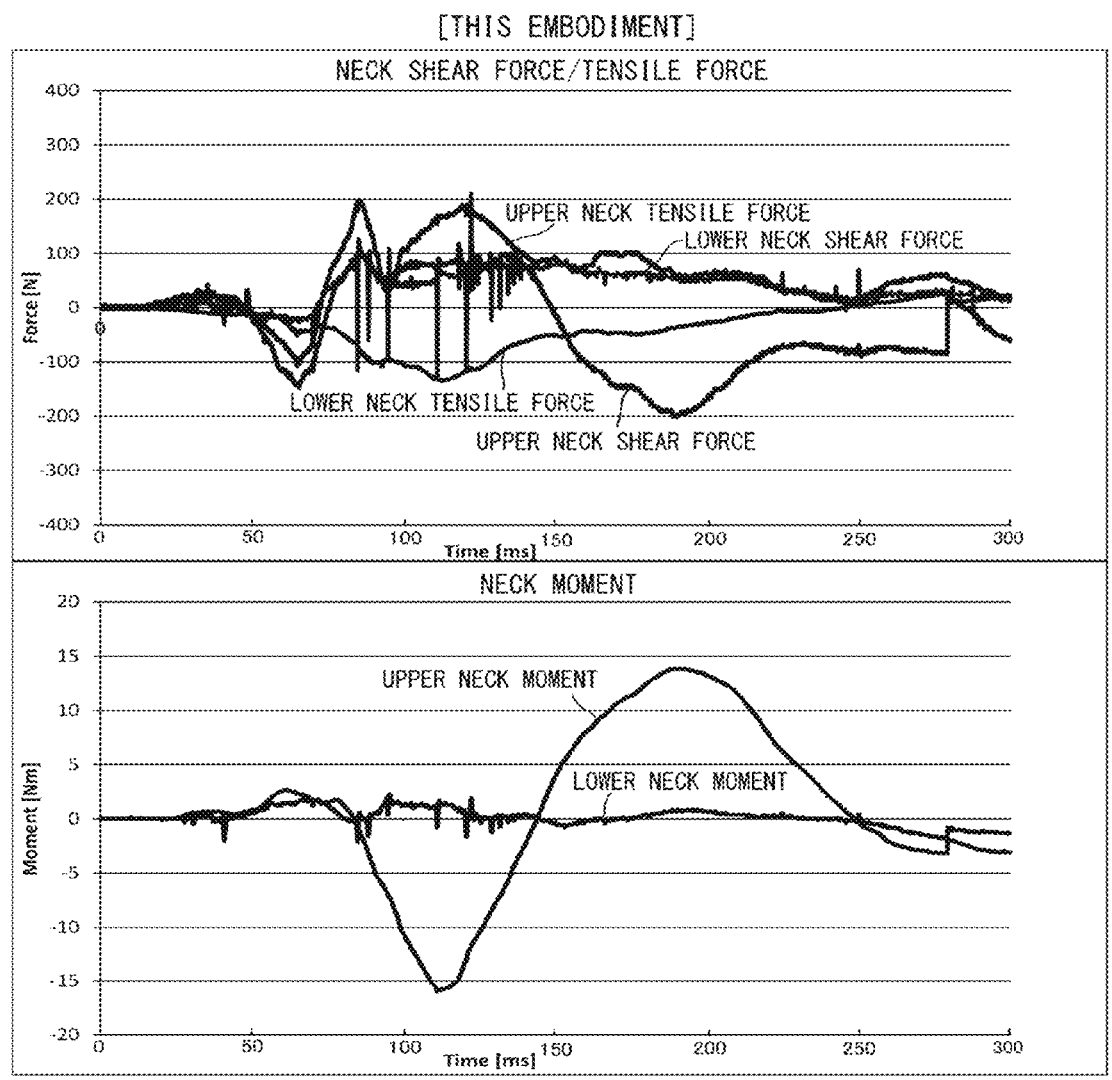
FIG. 12 is a diagram illustrating by enlargement a neck shear force/tensile force and a neck moment according to this embodiment for comparing with this comparative example 1.
Figure 13:
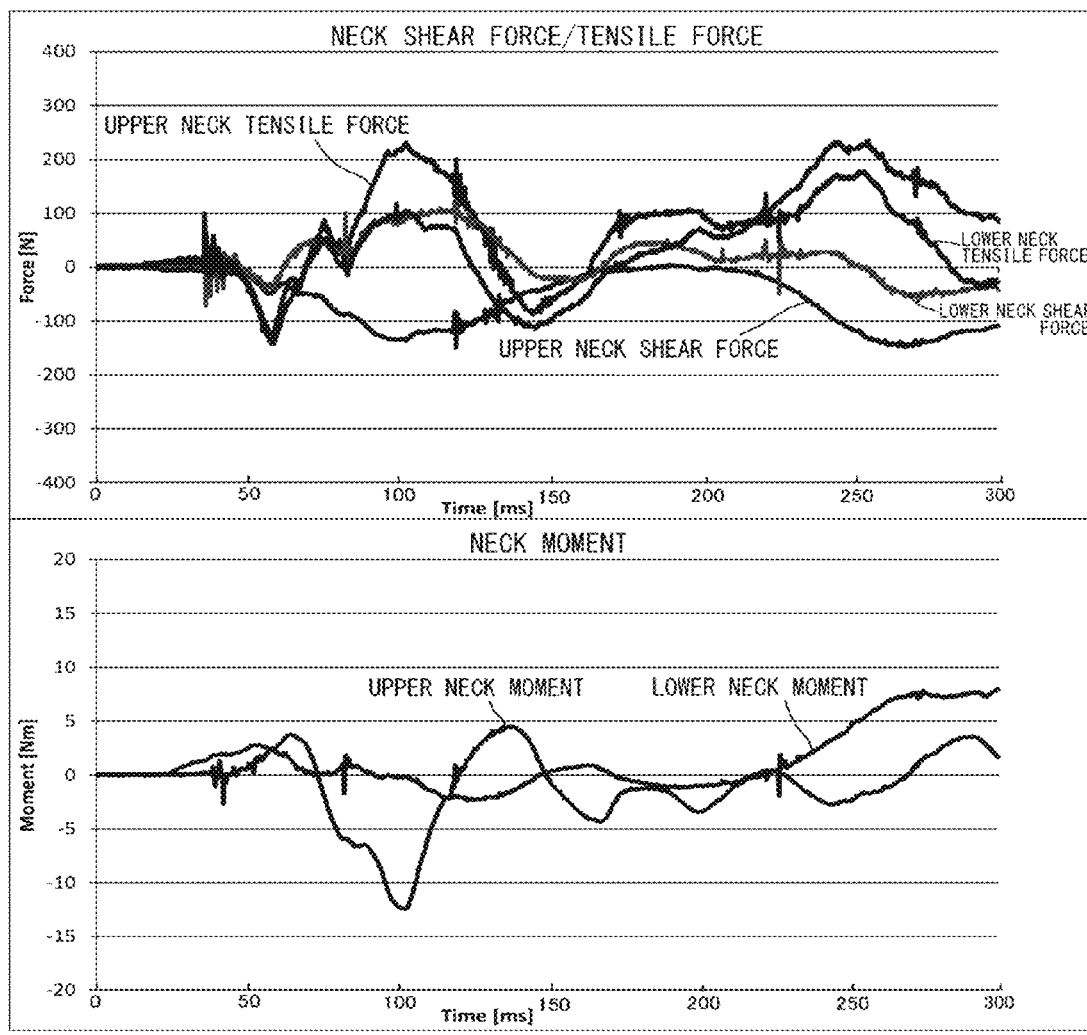
FIG. 13 is a diagram illustrating by enlargement a neck shear force/tensile force and a neck moment according to comparative example 1 for comparing with this embodiment.

FIG. 12 is a diagram illustrating by enlargement a neck shear force/tensile force and neck moment according to this embodiment illustrated in FIG. 11, and FIG. 13 is a diagram illustrating by enlargement a neck shear force/tensile force and neck moment according to comparative example 1 presented for comparison with this embodiment. From these data, in comparative example 1, the load/moment occurs also after the head and the head rest are in contact, but in the case of this embodiment, the load-moment converges while the head and the head rest are in contact.

Figure 14:
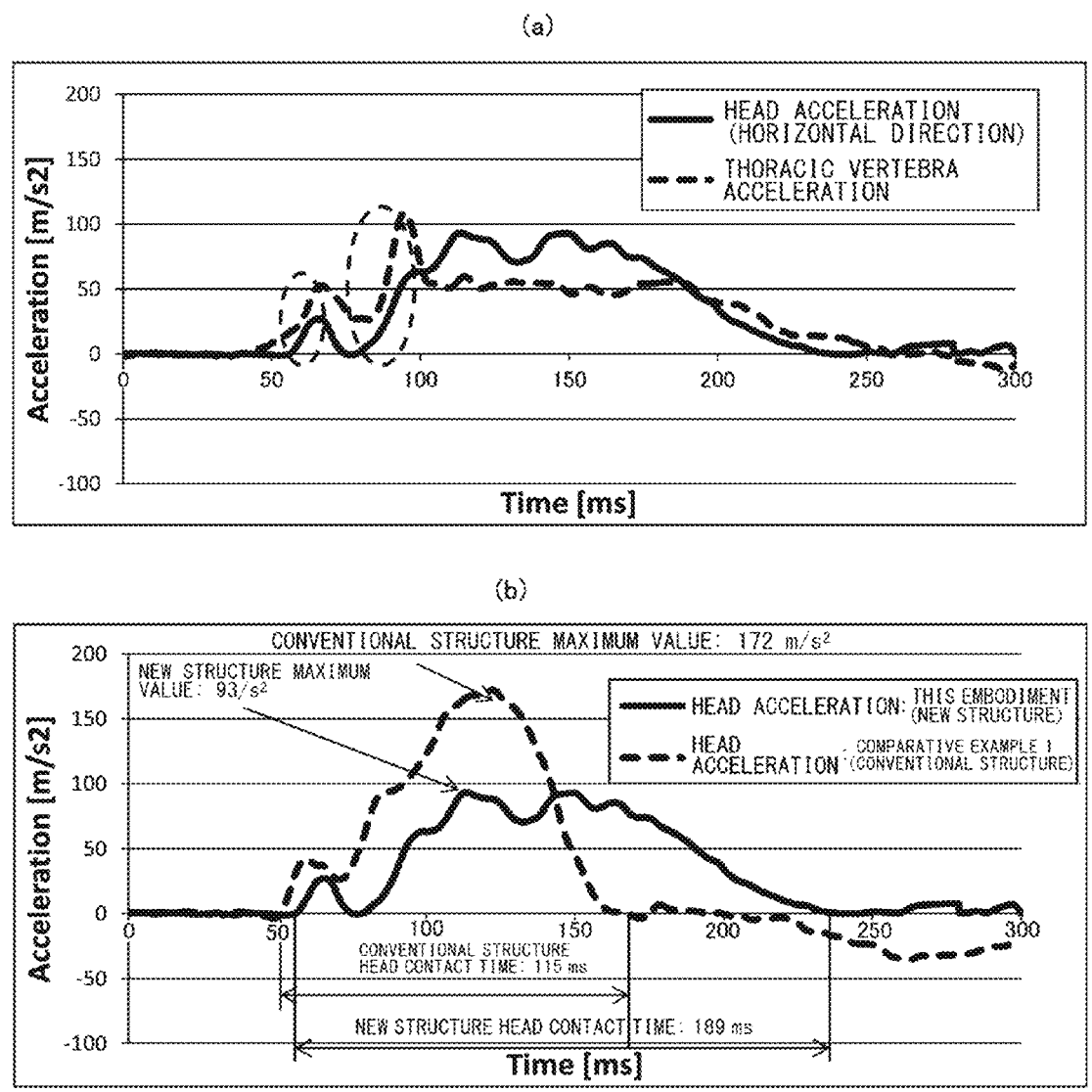
FIG. 14(a) is a diagram illustrating by enlargement test results of head acceleration and first thoracic vertebra acceleration in this embodiment.
FIG. 14(b) is a diagram illustrating together test results of head acceleration in this embodiment and comparative example 1.

FIG. 14(a) is a diagram illustrating results of head acceleration and first thoracic vertebra acceleration of the vehicle seat according to this embodiment illustrated in FIG. 11 again by enlargement for easiness of comparison, in which it can be seen that risings of acceleration of the head and acceleration of the first thoracic vertebra substantially match. This indicates that the difference in acceleration between the head and the first thoracic vertebra becomes small, suppressing increase of NIC. FIG. 14(b) is a diagram illustrating together head accelerations in the rear collision protection performance test of the vehicle seats including the cushion frame units according to this embodiment and comparative example 1. As is clear from FIG. 14, the maximum value of head acceleration was 93 m/s$^2$ with this embodiment, whereas it was 172 m/s$^2$ with comparative example 1, and the head contact time was 189.3 ms for this embodiment, whereas it was 115 ms with comparative example 1. Therefore, the vehicle seat of this embodiment can maintain the contact time of the head with the head rest for long time at low acceleration as compared with the comparative example.

Figure 15:
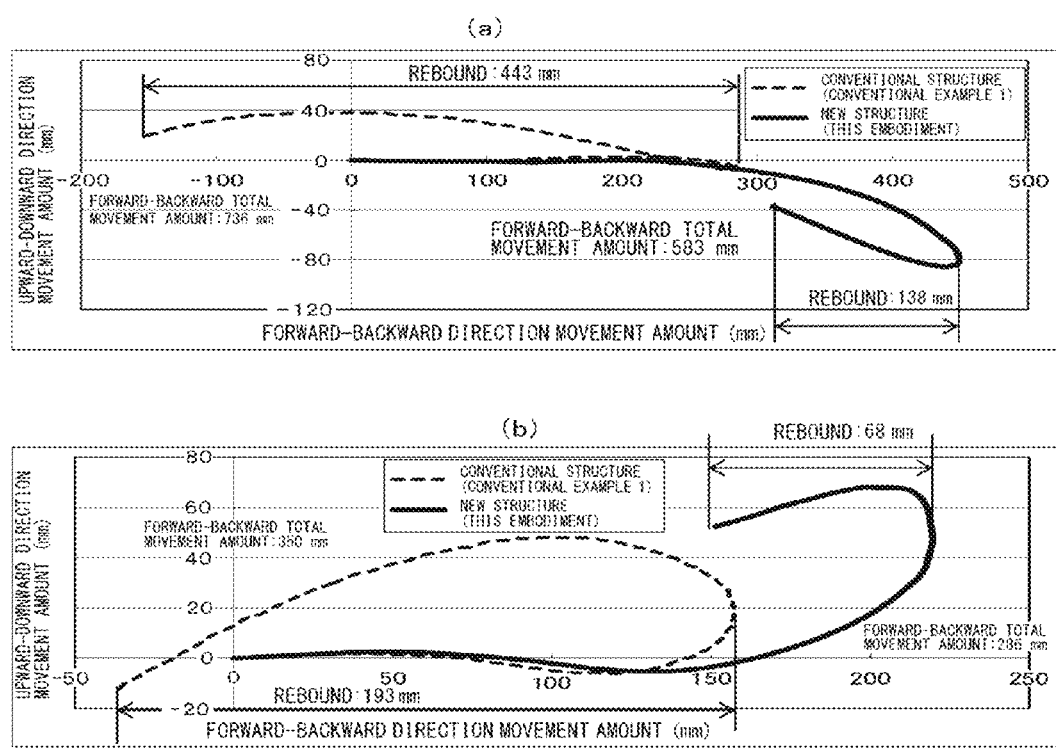
FIG. 15(a) is a diagram comparing head movement amounts in this embodiment and comparative example 1.
FIG. 15(b) is a diagram comparing lumbar movement amounts in this embodiment and comparative example 1.

FIG. 15 illustrate head movement amounts (FIG. 15(a)) and lumbar movement amounts (FIG. 15(b)) of the dummy according to this embodiment (new structure) and comparative example 1 (conventional structure). In this embodiment, the head movement amount decreases by 153 mm from comparative example 1, and the lumbar movement amount decreases by 64 mm. Further, in this embodiment, the forward-backward total movement amount is suppressed and rebound is also suppressed more than in comparative example 1. Therefore, it can be seen that, according to the present invention, rebound of the dummy is suppressed as compared with the conventional structure, and injuries to the head can be alleviated.

Figure 16:
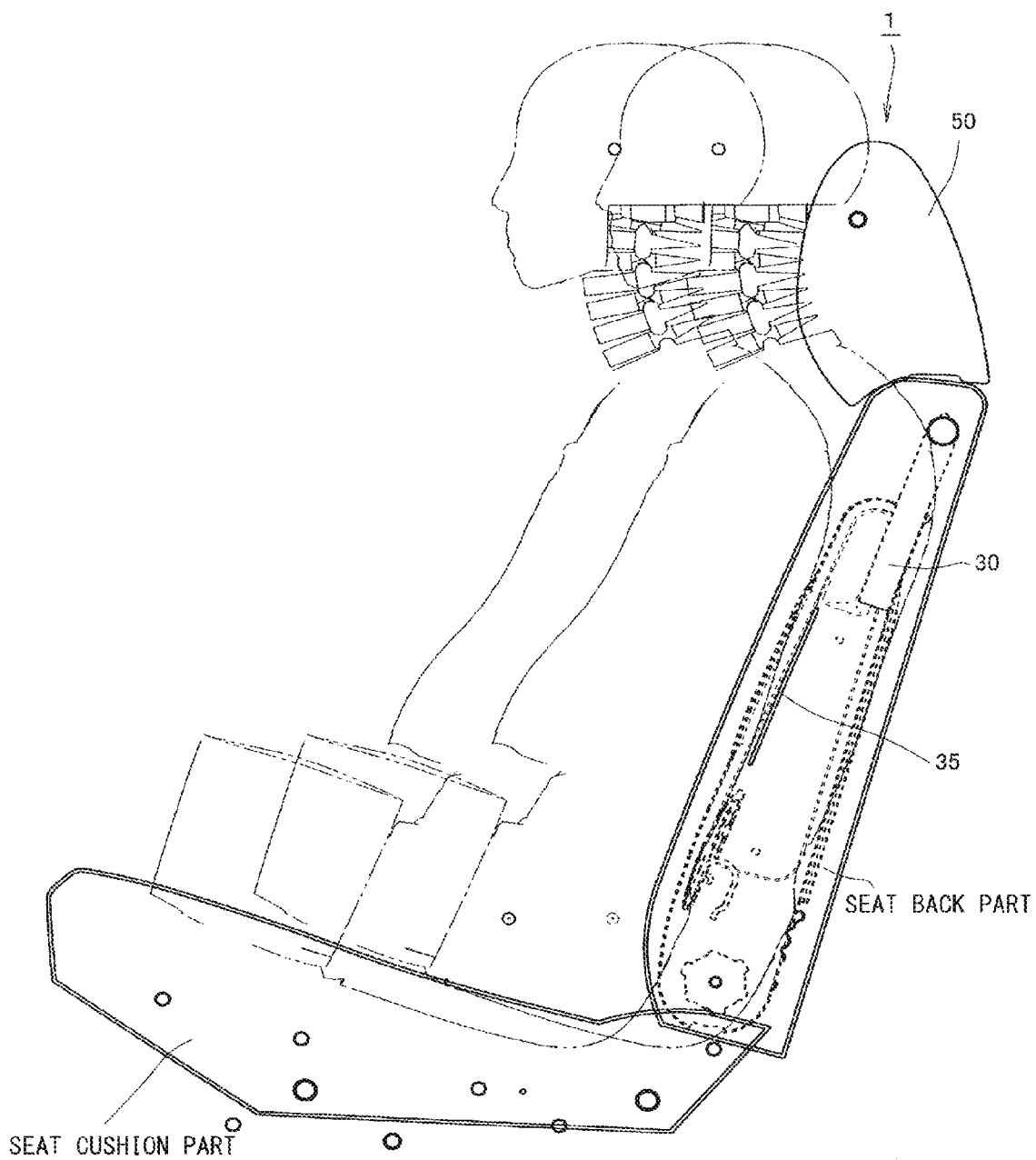
FIG. 16 is a view schematically illustrating a behavior of a dummy in the test of FIG. 10.

FIG. 16 is a view schematically illustrating a behavior of the dummy with this embodiment in the above-described test, from which it can be seen that after collision, the chest of the dummy enters the frame of the side frames 31, 31 of the back frame unit 30, the head quickly contacts the head rest 50, contortion or backbend of the neck does not occur, and thus the behavior difference was small.

Figure 17:
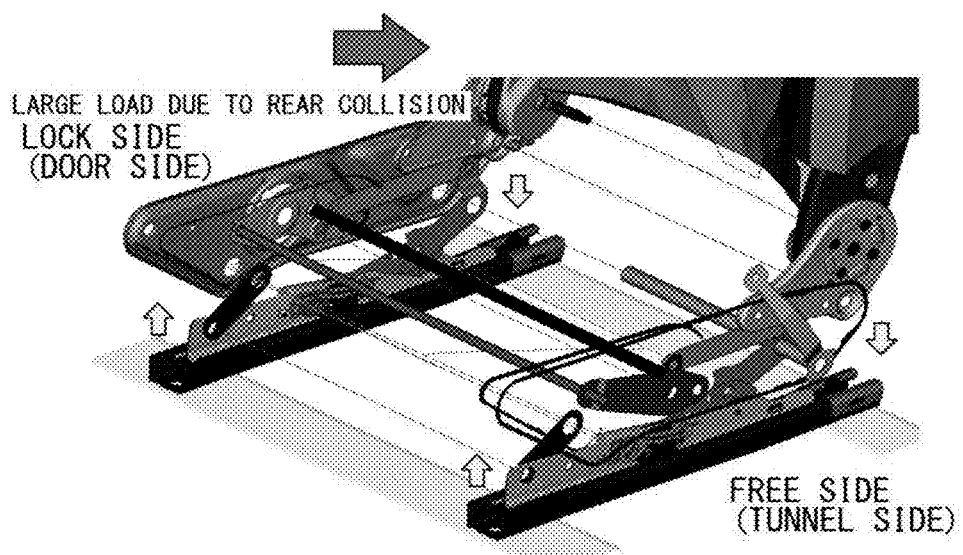
FIG. 17 is a view illustrating an analysis image of the cushion frame unit of this embodiment after the rear collision neck protection performance test of FIG. 10 was carried out.
Figure 18:
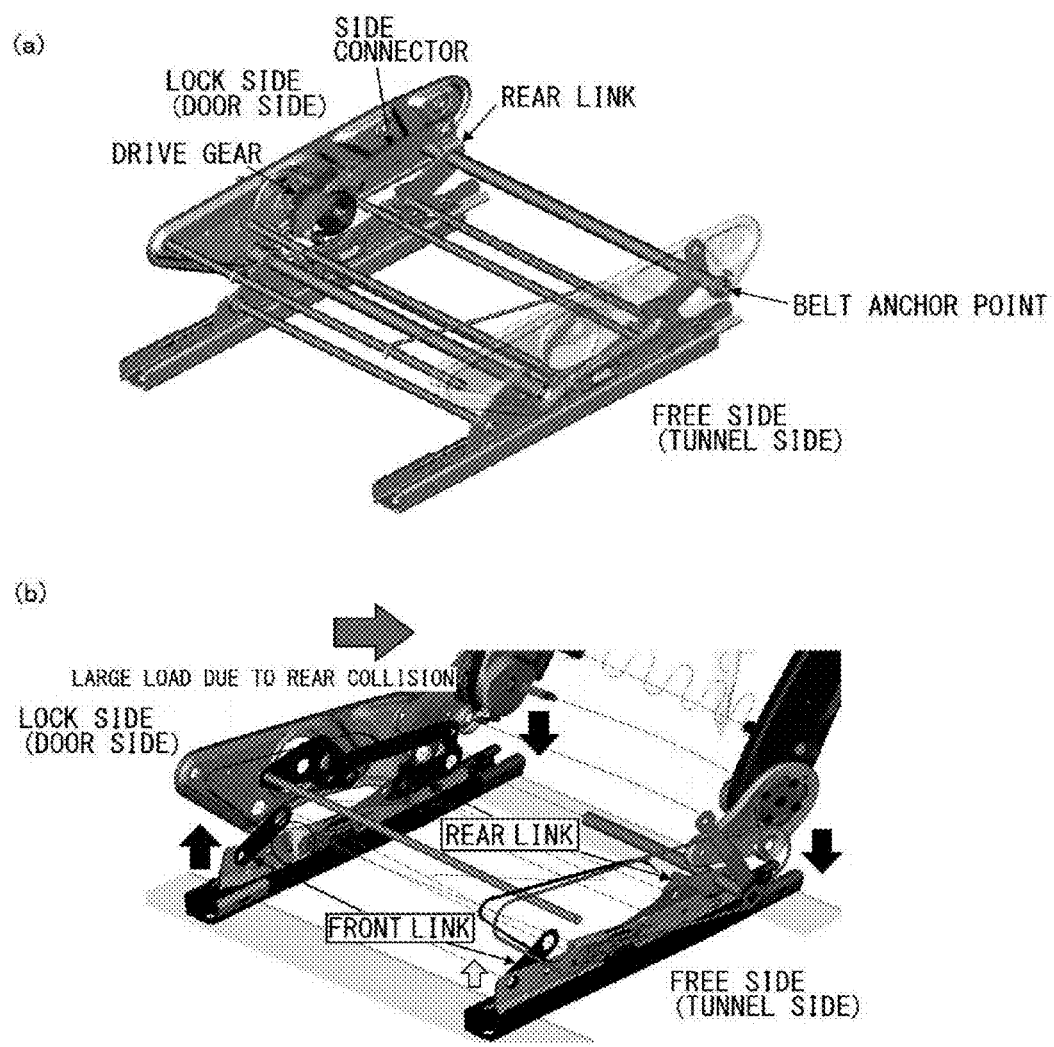
FIG. 18(a) is a diagram illustrating a cushion frame unit having a lifter mechanism part according to comparative example 2.
FIG. 18(b) is a view illustrating an analysis image of the cushion frame unit when a rear collision protection performance test was carried out under the same conditions as above on a vehicle seat having this cushion frame unit according to comparative example 2.

FIG. 17 is a view illustrating an analysis image of the cushion frame unit 10 according to this embodiment after the above-described rear collision neck protection performance test was carried out. On the other hand, FIG. 18(a) is a diagram illustrating a cushion frame unit according to comparative example 2, that is, a cushion frame unit obtained by excluding the coupling driving rod 170, the driving link 171, and the side connector 153 on the other side from the lifter mechanism part of this embodiment, and providing it with a lifter mechanism part similar to the structure disclosed in Patent Document 1 (cushion frame unit of what is called one-side lock mechanism in which the link on the lock side is coupled to the lifter mechanism part), and FIG. 18(b) is a view illustrating an analysis image of the cushion frame unit in a rear collision protection performance test carried out under the same conditions as above on a vehicle seat having this cushion frame unit according to comparative example 2. Note that the upward-downward displacement amount of the lifter mechanism part of the vehicle seat according to comparative example 2 is 50 mm at full stroke similarly to that in this embodiment, and the test was carried out with this amount being set to 25 mm which is an intermediate position thereof.

Comparing FIG. 17 and FIG. 18(b), in this embodiment, the shape of the virtual square coupling contact points of the driving link 171, the side connectors 153, 153, the coupling driving rod 170, and the drive gear 160d mostly does not collapse. Specifically, since the rear links 152, 152 on the both sides move in cooperation, the force to lift the portions close to the front ends of the upper rails 42, 42 with respect to the lower rails 41, 41 is small, and the downward displacement amount of rear portions of the side frames 11, 11 is small. In this point, in the case of comparative example 2, it can be seen that the vicinity of a front end of the right side frame which is the lock side (door side) is lifted up largely with respect to the lower rail together with the vicinity of a front end of the upper rail, and the vicinity of a rear end of the left side frame is deformed downward largely, resulting in a largely biased deformation. Specifically, on the free side (tunnel side), the rear link rotates and the lift of the front link is small, but since it is structured such that the links on the both sides do not move in cooperation, on the lock side (door side) the load concentrates on the front link and the front portion side of the slider is deformed, the front link is lifted, and the rear link is pushed down largely.

Figure 19:
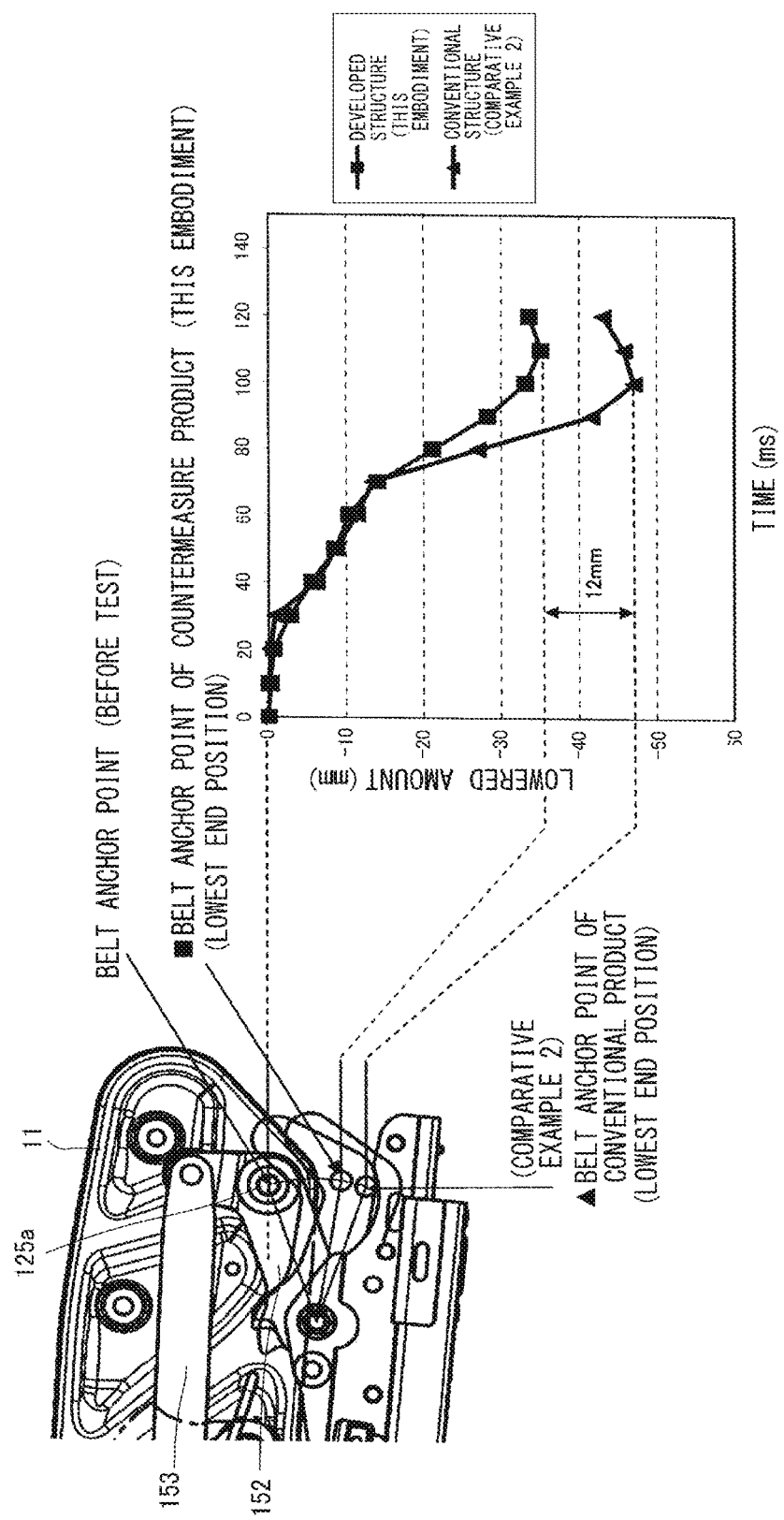
FIG. 19 is a view comparing downward displacement amounts in the vicinity of a rear end of a left side frame in this embodiment and in comparative example 2.

FIG. 19 is a view comparing the downward displacement amounts in the vicinity of the rear end of the left side frame (lowered amounts of the belt anchor point) in the case of this embodiment (developed structure) of FIG. 17 and in the case of comparative example 2 (conventional structure) of FIG. 18(b). Further, the relation between the lowered amount and time from the beginning of collision is also illustrated.

From these results, it can be seen that in this embodiment the lowered amount is smaller by 12 mm than the comparative example. Note that the lowered amount exceeds the stroke 25 mm from the intermediate position of the lifter mechanism part to the lower end in both this embodiment and comparative example 2, but this is because bends of other component members are included. Further, in the case of comparative example 2, the lowered amount (deformation speed) per unit time is large from about 70 ms to 100 ms where it reaches the lower end position, whereas in the case of this embodiment the deformation speed does not change largely.

This is because, in the case of this embodiment, the collapse of the shape of the virtual square coupling contact points of the driving link 171, the side connectors 153, 153, the coupling driving rod 170, and the drive gear 160d is small. That is, in addition to the pivotal support points between the front links 151, 151 and the rear links 152, 152 and the side frames 11, 11 supported by them, this embodiment includes the link mechanism on the side of one side frame 11 constituted of one side connector 153, one rear link 152, and the drive gear 160d which are pivotally supported with each other and the link mechanism on the side of the other side frame 11 constituted of the other side connector 153, the other rear link 152, and the driving link 171 which are pivotally supported with each other. Therefore, a force to deform downward is damped by synergistic actions of rotational friction forces working at the plurality of pivotal support points, the deformation speed is reduced, and equalization of speeds is achieved. Accordingly, a phenomenon such that the head rebounds several times from the head rest and then contacts the head rest is prevented, contributing to reduction of a neck injury.

EXPLANATION OF REFERENCE SYMBOLS

1 vehicle seat
10 cushion frame unit
11 side frame
30 back frame unit
31 side frame
32 upper frame
33 lower frame
35 fabric
40 seat slide device
40A slider
41 lower frame
42 upper frame
50 head rest
151 front link
152 rear link 153 side connector
160 lifting driving part
160d drive gear
170 coupling driving rod
171 driving link

The invention claimed is:

1. A lifter mechanism for supporting a cushion frame unit supporting a cushion member for a seat cushion part in a manner capable of lifting or lowering by driving a lifting driving part with respect to a left slider and a right slider constituting a seat slide device, the lifter mechanism comprising:
a front link and a rear link provided between each of side frames disposed on a left side and a right side of the cushion frame unit and one of the sliders;
a lifting driving part comprising a drive gear provided on one side frame out of the side frames and disposed between the front link and the rear link of a side of the one side frame, so as to transmit a driving force for lifting or lowering;
a coupling driving rod including one end that is coupled to a rotation center of the drive gear to rotate with the drive gear;
one side connector on the side of the one side frame where the lifting driving part is provided, the one side connector extending forward from the rear link of the side of the one side frame and bridged to the drive gear;
another side connector on a side of the other side frame where the lifting driving part is not provided, to extend forward from the rear link of the side of the other side frame; and
a driving link with one end coupled to a front end of the other side connector,
wherein another end of the coupling driving rod is structured to be coupled to another end of the driving link, so as to transmit a rotation force of the drive gear to the driving link via the coupling driving rod.

2. The lifter mechanism according to claim 1, wherein the driving link, the side connectors, and the coupling driving rod each have stiffness to elastically deform against an external input that plastically deforms lower rails or upper rails close to front ends of the sliders, when the external input is in a predetermined range.

3. The lifter mechanism according to claim 2, wherein a material constituting the side connectors and the driving link is a plate thicker than or a high-stiffness member higher in a second moment of inertia than a material constituting the lower rails or the upper rails of the sliders.

4. The lifter mechanism according to claim 1, wherein the rotation center of the drive gear and the coupling driving rod are provided in a substantially middle position between the front links and the rear links.

5. The lifter mechanism according to claim 1, wherein a crushable zone which deforms relatively easier than a surrounding portion when an external input of a predetermined value or higher is received is set in a vicinity of a belt anchor point in the side frames of the cushion frame unit.

6. A vehicle seat, comprising:
a seat cushion part and a seat back part, wherein:
the seat cushion part includes a cushion frame unit supporting a cushion member for the seat cushion part;
a left side frame and a right side frame constituting the cushion frame unit are coupled respectively, via a lifter mechanism, to a left slider and a right slider, which constitute a seat slide device, to be supported thereon; and
the lifter mechanism comprises
a front link and a rear link provided between each of side frames disposed on a left side and a right side of the cushion frame unit and one of the sliders;
a lifting driving part comprising a drive gear provided on one side frame out of the side frames and disposed between the front link and the rear link of a side of the one side frame, so as to transmit a driving force for lifting or lowering;
a coupling driving rod including one end that is coupled to a rotation center of the drive gear to rotate with the drive gear;
one side connector on the side of the one side frame where the lifting driving part is provided, the one side connector extending forward from the rear link of the side of the one side frame and bridged to the drive gear;
another side connector on a side of the other side frame where the lifting driving part is not provided, to extend forward from the rear link of the side of the other side frame; and
a driving link with one end coupled to a front end of the other side connector,
wherein another end of the coupling driving rod is structured to be coupled to another end of the driving link, so as to transmit a rotation force of the drive gear to the driving link via the coupling driving rod.

7. The vehicle seat according to claim 6, wherein the seat back part comprises a back frame unit supporting a cushion member for the seat back part and coupled to the cushion frame unit and a head rest provided on an upper portion of the back frame unit;
a two-dimensional or three-dimensional fabric is bridged with a stretch rate of 5% or lower across middle portions in an upward and downward direction of a pair of side frames of the back frame unit; and
when a force in a direction to tilt the back frame unit rearward operates by an external input of a predetermined value or higher, the head of a seated person is supported by the head rest and the chest enters a frame of the pair of side frames and is supported by the fabric.

8. The vehicle seat according to claim 7, wherein the pair of side frames of the back frame unit have a predetermined width and is provided so that a direction of the width is along a forward and backward direction of the vehicle seat, and an upper frame supporting the head rest and a lower frame disposed between lower portions of the side frames are both provided on sides of rear edge portions of the side frames, and the fabric is bridged across front edge portions of the side frames.

9. The vehicle seat according to claim 7, wherein the fabric is bridged across positions including a range corresponding to a vicinity of the chest of the seated person.

10. The vehicle seat according to claim 7, wherein a lumbar support part comprising a spring member is provided between lower portions of the pair of side frames of the back frame unit and below the fabric.

* * * * *